(12) United States Patent
Lu et al.

(10) Patent No.: US 10,598,945 B1
(45) Date of Patent: Mar. 24, 2020

(54) MULTIFOCAL SYSTEM USING PIXEL LEVEL POLARIZATION CONTROLLERS AND FOLDED OPTICS

(71) Applicant: Facebook Technologies, LLC, Menlo Park, CA (US)

(72) Inventors: Lu Lu, Kirkland, WA (US); Wai Sze Tiffany Lam, Redmond, WA (US); Ying Geng, Bellevue, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/559,435

(22) Filed: Sep. 3, 2019

Related U.S. Application Data

(63) Continuation of application No. 15/471,961, filed on Mar. 28, 2017, now Pat. No. 10,451,885.

(51) Int. Cl.
*G02B 27/14* (2006.01)
*G06F 3/01* (2006.01)
*G02B 27/28* (2006.01)

(52) U.S. Cl.
CPC ........... *G02B 27/14* (2013.01); *G02B 27/286* (2013.01); *G06F 3/013* (2013.01)

(58) Field of Classification Search
CPC .................................................... G02B 27/286
See application file for complete search history.

(56) References Cited

U.S. PATENT DOCUMENTS

2015/0301249 A1* 10/2015 Pau .................. G02B 5/3016
349/124
2018/0048881 A1* 2/2018 Eash .................... G02F 1/0136

* cited by examiner

*Primary Examiner* — Gustavo Polo
(74) *Attorney, Agent, or Firm* — Fenwick & West LLP

(57) ABSTRACT

A head-mounted display (HMD) that includes optical components that provide multiple focal distances for light emitted from an electronic display. The HMD includes a multifocal structure having a plurality of optical components positioned in series such that light from an electronic display is received and passes through the optical components at least once before being output from the multifocal structure. The plurality of optical components includes a pixel level polarizer positioned to receive light from the electronic display. The pixel level polarizer has a first configuration that causes the pixel level polarizer to linearly polarize light in a first direction and a second configuration that causes the pixel level polarizer to linearly polarize light in a second direction that is different than the first direction. The multifocal structure is configured to output image light different focal distances based in part on the configuration of the pixel level polarizer.

20 Claims, 20 Drawing Sheets

(Real World)

(3D Display)

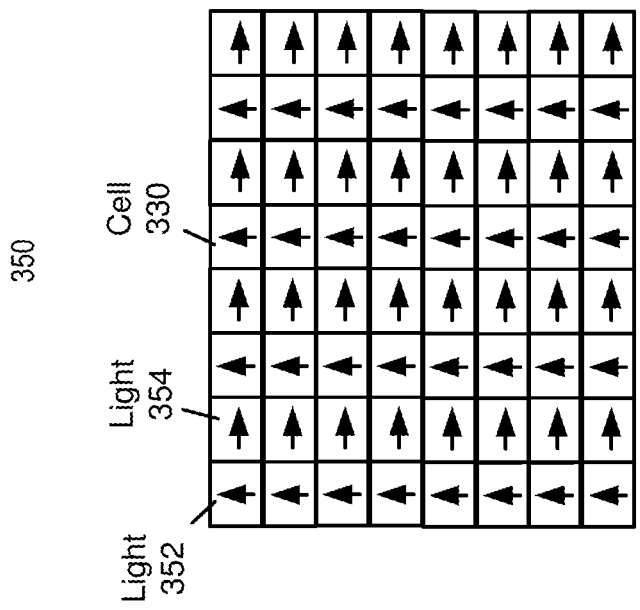
FIG. 3B
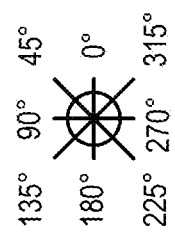
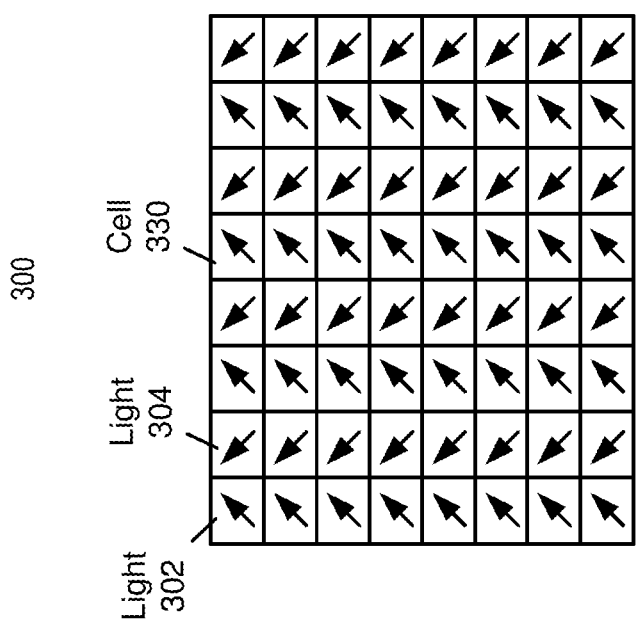
FIG. 3A

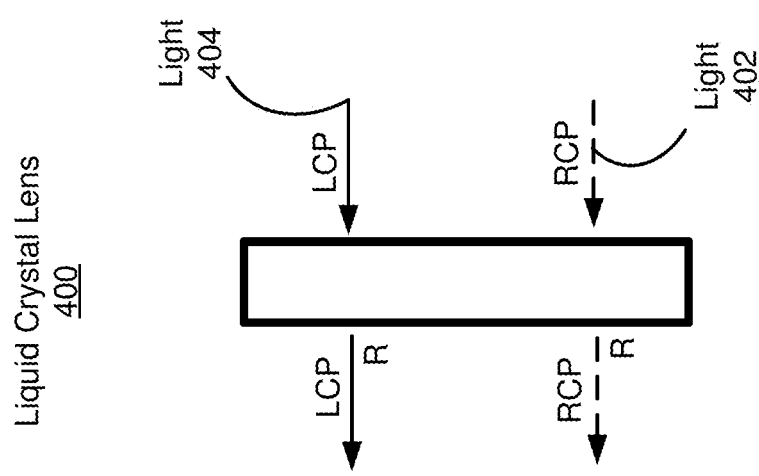

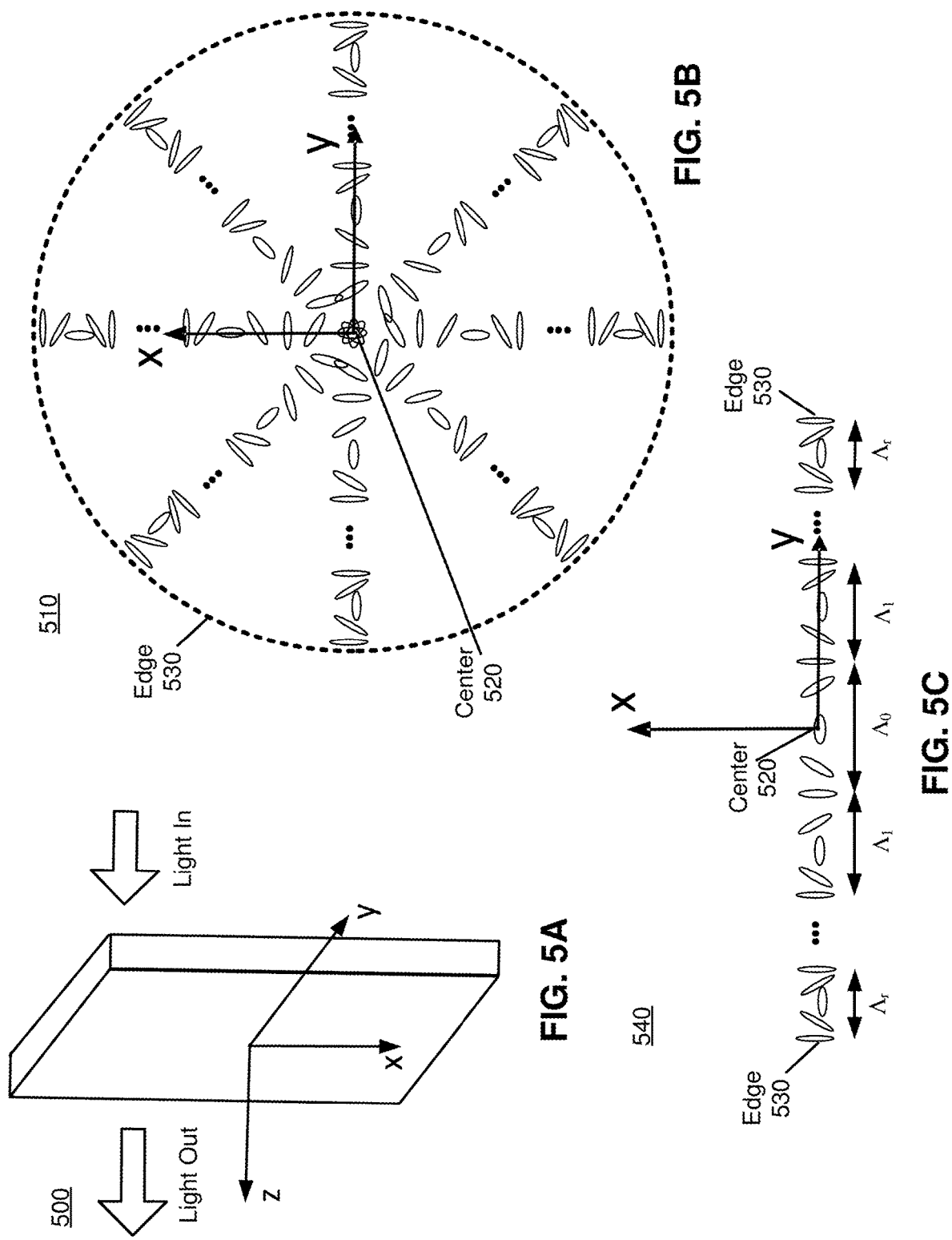

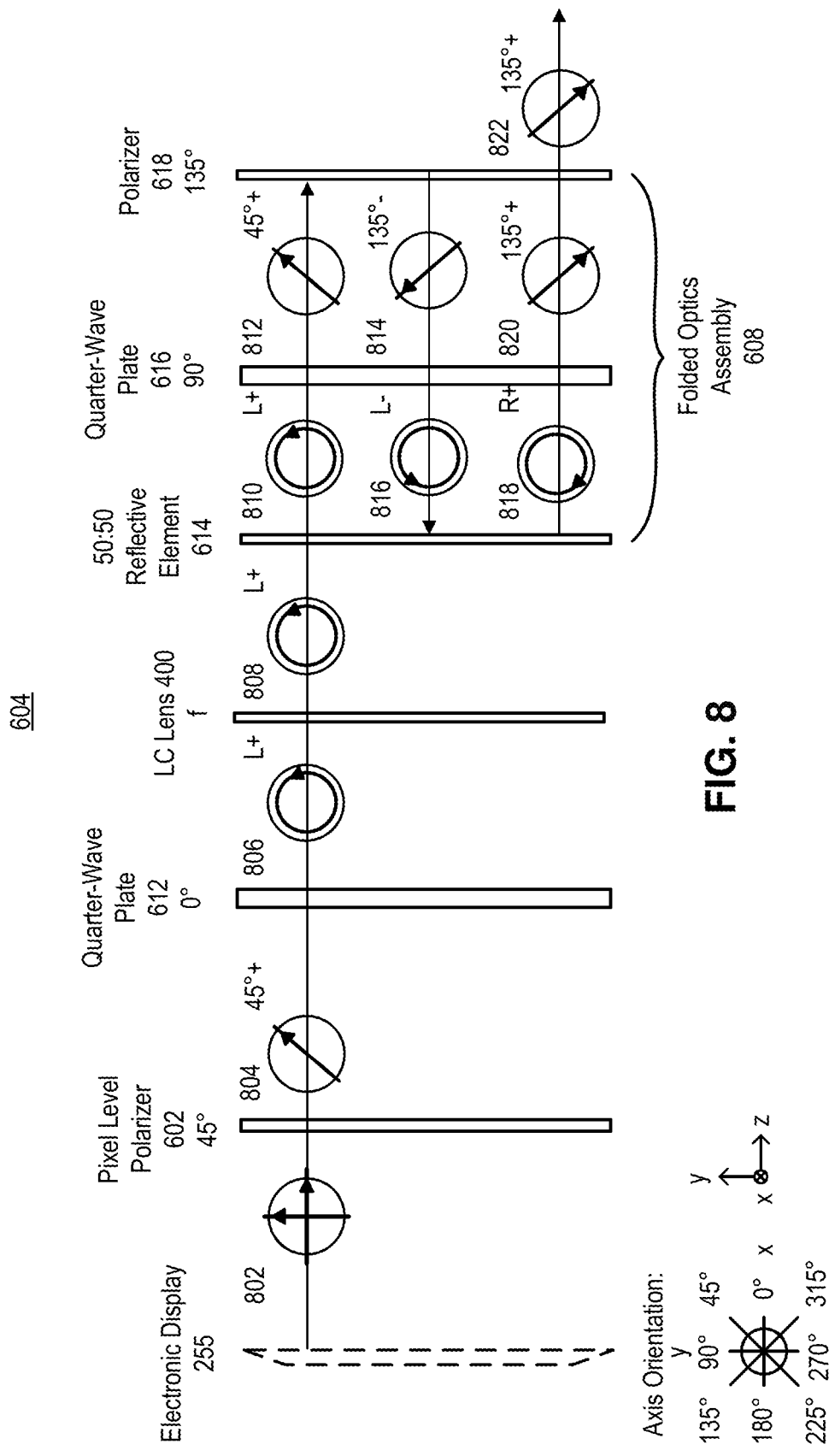

MULTIFOCAL SYSTEM USING PIXEL LEVEL POLARIZATION CONTROLLERS AND FOLDED OPTICS

CROSS REFERENCE TO RELATED APPLICATIONS

This application is a continuation of co-pending U.S. application Ser. No. 15/471,961, filed Mar. 28, 2017, which is incorporated by reference in its entirety.

BACKGROUND

This invention relates generally to optical systems and specifically relates to a multifocal optical system with polarizing elements.

Head-mounted displays (HMDs) may be used to present augmented and/or virtual information to a user. For example, a virtual reality (VR) headset can be used to simulate virtual environments. Conventionally, a HMD presents stereoscopic images on an electronic display inside the HMD to simulate the illusion of depth. However, conventional HMDs are often unable to compensate for vergence and accommodation conflict when rendering content, which may cause double vision, visual fatigue, and nausea in users.

SUMMARY

A head-mounted display (HMD) presents images at multiple focal distances, such as at four or more different focal distances. The HMD includes a multifocal structure having a plurality of optical components positioned in series such that light from an electronic display is received and passes through the optical components at least once before being output from the multifocal structure. The plurality of optical components includes a pixel level polarizer positioned to receive light from the electronic display. The pixel level polarizer has a first configuration that causes the pixel level polarizer to linearly polarize light in a first direction and a second configuration that causes the pixel level polarizer to linearly polarize light in a second direction that is different than the first direction. The multifocal structure is configured to output image light different focal distances based in part on the configuration of the pixel level polarizer.

The multifocal structure may include a liquid crystal (LC) lens element that has a state that adjusts optical power of incident light and a neutral state that does not affect optical power of incident light. The multifocal structure may also include a folded optics assembly that directs light along different optical paths based in part on a polarization of light incident on the folded optics assembly, and wherein the different optical paths each have different optical path lengths. Different combinations of optical paths and optical power adjustments can be used to create multiple (e.g., four) image planes.

In some embodiments, the LC lens element is a Pancharatnam Berry Phase (PBP) LC lens having an additive state that adds optical power, subtractive state that subtracts optical power, and a neutral state. In some embodiments, the LC lens element is a liquid crystal lens having an additive state that adds optical power and a neutral state.

An eye tracking system (e.g., including processing circuitry) may be connected with the multifocal structure to provide focus instructions to the multifocal structure. Responsive to receipt of the focus instructions, the multifocal structure configures the pixel level polarizer and sets the state of the LC lens element to output light at a selected focal distance. In some embodiments, the focus instructions provide for cell level control of the pixel level polarizer to select focal distances for light emitted from the pixels of the electronic display.

Some embodiments may include an optical system for an electronic display. The optical system includes a multifocal structure having a plurality of possible focal distances. The multifocal structure includes: a plurality of optical components positioned in series such that light from an electronic display is received and passes through each of the plurality of optical components at least once before being output from the multifocal structure. The plurality of optical components include: a pixel level polarizer positioned to receive light from the electronic display, the pixel level polarizer having a first configuration that causes the pixel level polarizer to linearly polarize light in a first direction and a second configuration that causes the pixel level polarizer to linearly polarize light in a second direction that is different than the first direction, and a LC lens element having an active state that adjusts optical power of incident light and a neutral state that does not affect optical power of incident light, wherein the multifocal structure is configured to output image light at one or more different focal distances based in part on the configuration of the pixel level polarizer and the state of the LC lens element.

Some embodiments may include methods of operating the HMD to produce multiple focal distances.

BRIEF DESCRIPTION OF THE DRAWINGS

FIG. 3A illustrates an example of a pixel level polarizer, according to one embodiment.

FIG. 3B illustrates another example of a pixel level polarizer, according to one embodiment.

FIG. 4A illustrates a liquid crystal lens, according to one embodiment.

FIG. 5A illustrates a PBP lens, according to one embodiments.

FIG. 5B illustrates an example of liquid crystal orientations in the PBP lens of FIG. 4A, according to an embodiment.

FIG. 5C is a section of liquid crystal orientations of the PBP lens of FIG. 4A, according to an embodiment.

FIG. 8 illustrates an optical path in the multifocal structure shown in FIG. 6, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
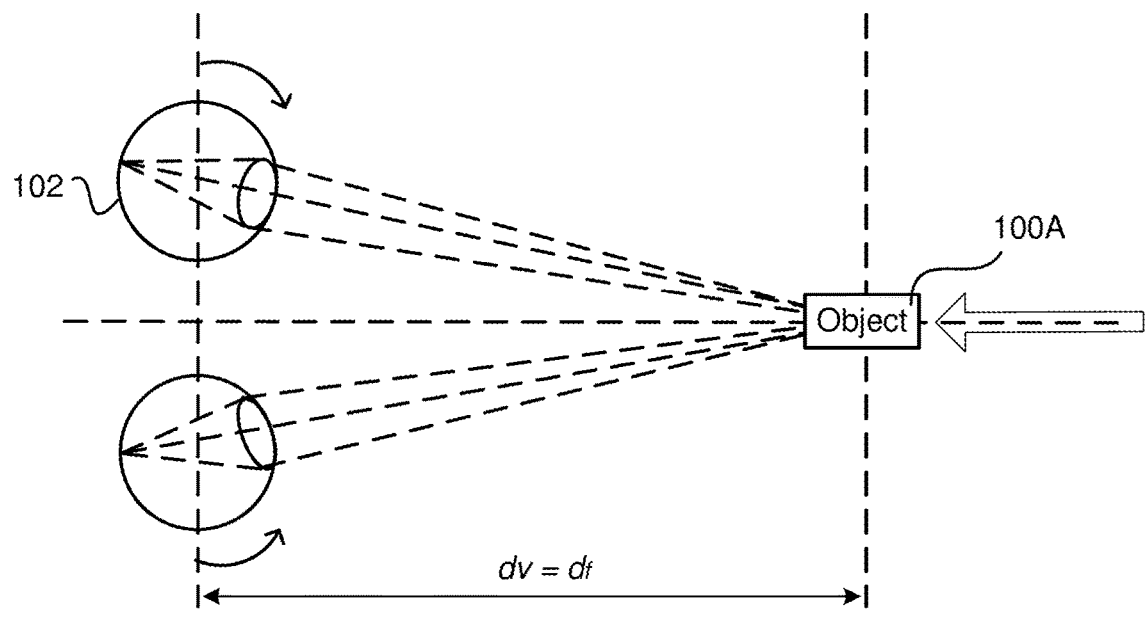
FIG. 1A shows an example of how a human eye experiences vergence and accommodation in a real world, according to one embodiment.

Vergence-accommodation conflict is a problem in many augmented reality or virtual reality systems. Vergence is the simultaneous movement or rotation of both eyes in opposite directions to obtain or maintain a single binocular vision and is connected to accommodation of the eye. Under normal conditions, when human eyes look at a new object at a distance different from an object they had been looking at, the eyes automatically change focus (by changing the shape of their lens) to provide accommodation at the new distance or vergence depth of the new object. FIG. 1A shows an example of how the human eyes experience vergence and accommodation in the real world. In the example of FIG. 1A, the user is looking at a real object 100A (i.e., the user's eyes are verged on the real object 100A and gaze lines from the user's eyes intersect at the real object 100A). As the real object 100A is moved closer to the user, as indicated by the arrow in FIG. 1A, each eye 102 rotates inward (i.e., convergence) to stay verged on the real object 100A. As the real object 100A gets closer, the eye 102 must "accommodate" for the closer distance by changing the shape of its lens to increase focusing power or reduce focal length. Thus, under normal conditions in the real world, the vergence depth ($d_v$) equals the focal point ($d_f$).

Figure 1B:
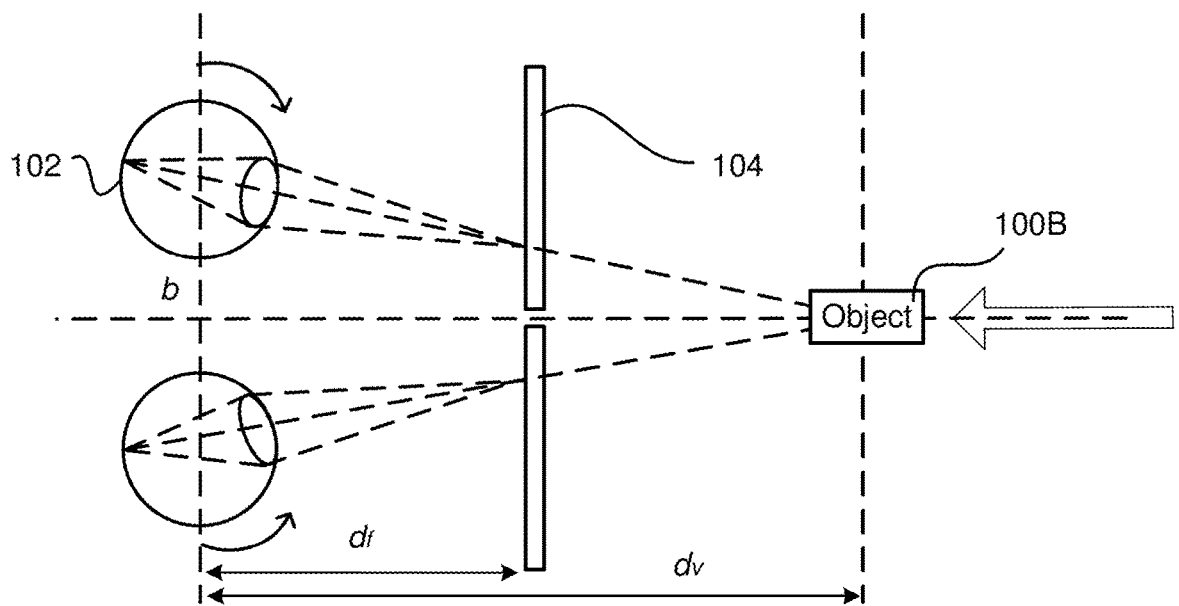
FIG. 1B shows an example conflict between vergence and accommodation that can occur with some three-dimensional displays, according to one embodiment.

FIG. 1B shows an example conflict between vergence and accommodation that can occur with some three-dimensional (3D) electronic displays. In this example, a user is looking at a virtual object 100B displayed on an electronic screen 104; however, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but there is no increased focusing power or reduced focal length of each eye; hence, the user's eyes do not accommodate as in FIG. 1A. Thus, instead of increasing focusing power or reducing focal length to accommodate for the closer vergence depth, each eye 102 maintains accommodation at a distance associated with the electronic display 104. Thus, the vergence depth ($d_v$) often does not equal the focal point ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for head mounted displays.

In addition to vergence-accommodation conflict, augmented reality systems can create real object-AR image mismatch. Here, a visual augmented image fails to be matched with a real-object. For example, an AR object that is displayed on a (e.g., transparent) electronic display as being on top of a real-world object (e.g., a desk) can result in real object-AR image mismatch if the vergence depth of the real-world object is at a different focal distance than the AR object in the electronic display. The techniques discussed herein reduce vergence-accommodation conflict and real object-AR image mismatch for HMDs.

Figure 2A:
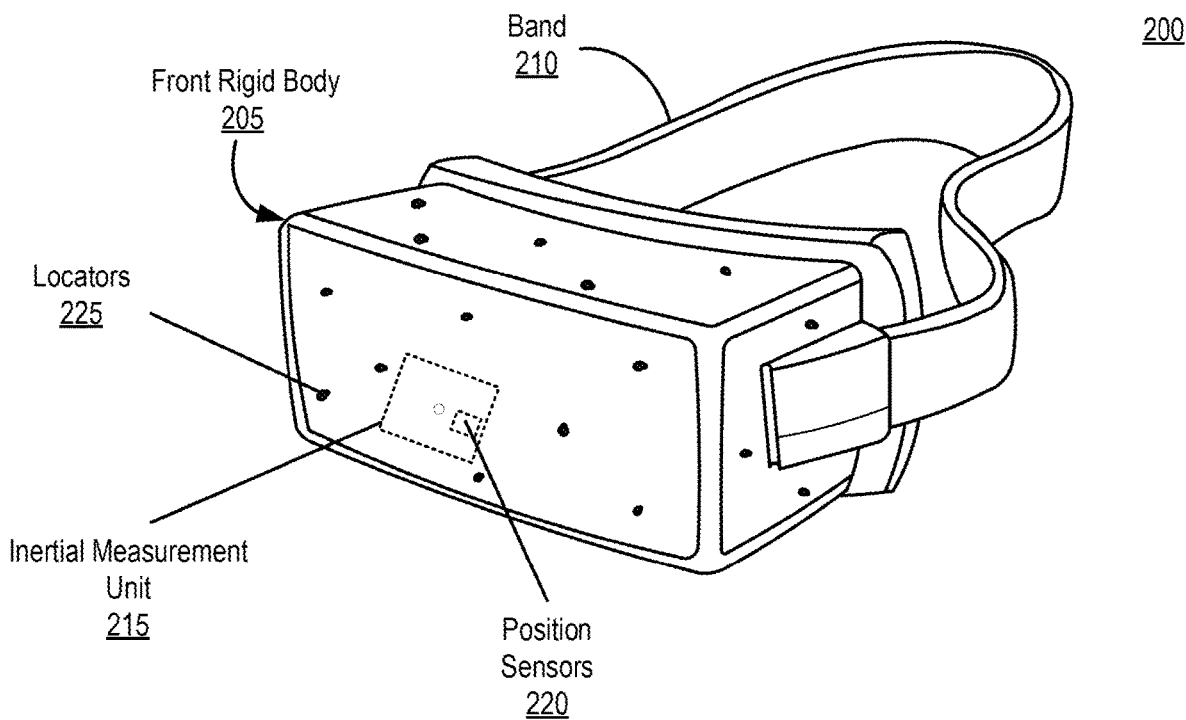
FIG. 2A is a wire diagram of a head mounted display (HMD), according to one embodiment.

FIG. 2A is a wire diagram of a head mounted display (HMD) 200, according to one embodiment. The HMD 200 may be for use in a virtual reality (VR) system, an augmented reality (AR) system, a mixed reality (MR) system, or some combination thereof. The HMD 200 includes a front rigid body 205 and a band 210. In some embodiments, portions of the HMD 200 may be at least partially transparent (e.g., if the HMD 200 is part of an AR or MR system). For example, portions of the front side 206 and intervening components (e.g., electronic display) between the front side 206 and an eye of a user may be transparent. The front rigid body 205 includes other components of the HMD 200, such as the inertial measurement unit 215, position sensors 220, and locators 225. These and other components are discussed in greater detail below in connection with FIG. 14.

Figure 2B:
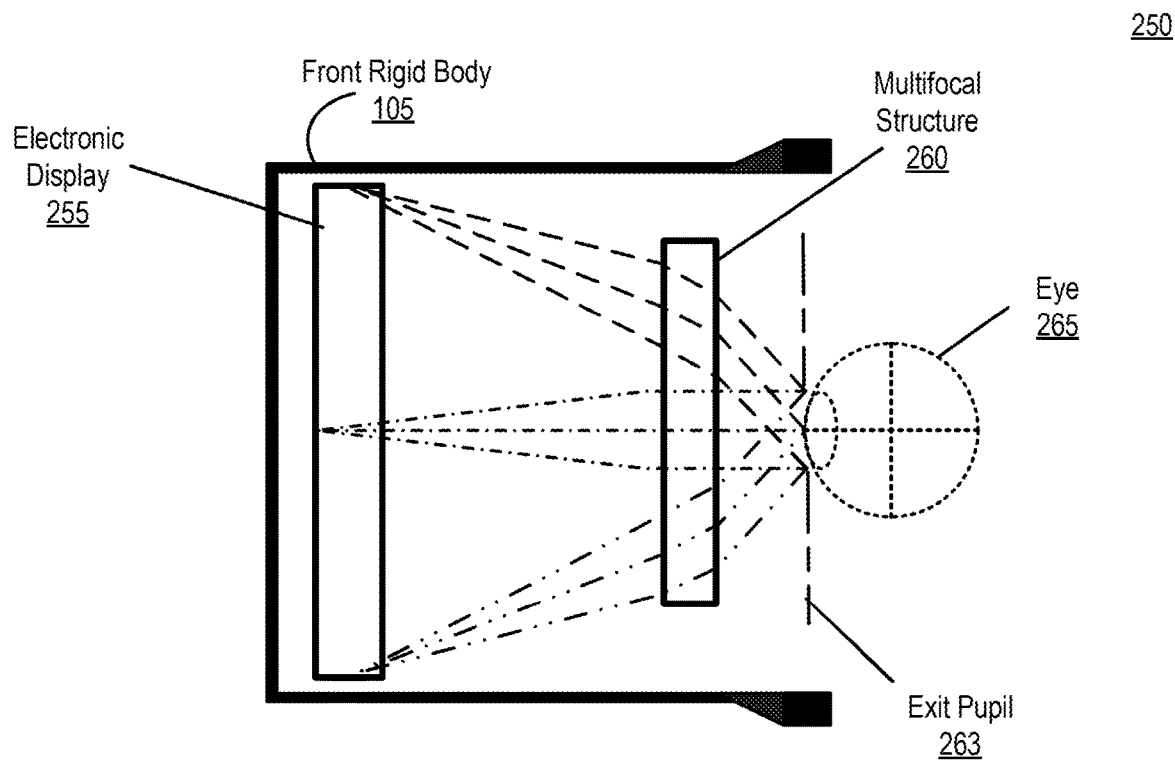
FIG. 2B is a cross section of a front rigid body of the HMD shown in FIG. 2A, according to one embodiment.

FIG. 2B is a cross section 250 of the front rigid body 205 of the embodiment of the HMD 200 shown in FIG. 2A. As shown in FIG. 2B, the front rigid body 205 includes an electronic display 255 and a multifocal structure 260 that together provide image light to an exit pupil 263. The exit pupil 263 is the location of the front rigid body 205 where a user's eye 265 is positioned. For purposes of illustration, FIG. 2B shows a cross section 250 associated with a single eye 265, but another optics block, separate from the multifocal structure 260, provides altered image light to another eye of the user.

The electronic display 255 displays images to the user. In various embodiments, the electronic display 255 may include a single electronic display or multiple electronic displays (e.g., a display for each eye of a user). Examples of the electronic display 255 include: a liquid crystal display (LCD), an organic light emitting diode (OLED) display, an active-matrix organic light-emitting diode display (AMOLED), a QOLED, a QLED, some other display, or some combination thereof.

The multifocal structure 260 includes adjusts an orientation of light emitted from the electronic display 255 such that it appears at one or more particular focal distances from the user. The multifocal structure 260 includes a plurality of optical components such as, for example, a pixel level polarizer, a lens, a liquid crystal (LC) lens element (e.g., including a PBP (Pancharatnam Berry Phase) LC lens or other type of LC lens), a partially reflective surface, a polarizer, a passive waveplate (e.g., half waveplate, quarter waveplate), a switchable waveplate (e.g., SHWP), a beam splitter (e.g., 50:50 beam splitter), a beam splitting polarizer (e.g., reflective linear polarizer or wire grid polarizer), a polarization rotator (e.g., a Faraday rotator), or any other suitable optical component that affects the image light emitted from the electronic display 255. Moreover, a multifocal structure 260 may include combinations of different optical components. In some embodiments, one or more of the optical components in the multifocal structure 260 may have one or more coatings, such as anti-reflective coatings. A liquid crystal lens can provide different optical power adjustments for light emitted from the electronic display 255, and partially reflective surfaces created a folded optics system that provides a polarization dependent path (e.g. direct or folded) for the light emitted from the electronic display 255. Using different combinations of optical power and optical path configurations, the light emitted from pixels of the electronic display 255 can be placed at one or multiple different focal distances.

The multifocal structure 260 adjusts the focal distance by adjusting the length of the optical path of light (path length) emitted from the electronic display 255. Each focal distance corresponds to a respective focal plane, and each focal plane is associated with a respective path length of image light that propagates from the electronic display 255 to the exit pupil 263. The multifocal structure 260 varies the path length of the image light, and thus the focal planes, by varying a number of reflections the image light undergoes in the multifocal structure 260. A larger number of reflections increases the path length and, accordingly, presents a focal plane further away from the user. Likewise, a smaller number of reflections decrease the path length and, accordingly, presents a focal plane close to the user. The location of the focal planes also depends on focal lengths of the optical components within the optical path.

Additionally, in some embodiments, the multifocal structure 260 magnifies received light, corrects optical errors (e.g., field curvature, chromatic aberration, etc.) associated with the image light, and presents the corrected image light to a user of the HMD 200.

FIG. 3A illustrates a pixel level polarizer 300, in accordance with one embodiment. The pixel level polarizer 300 is an example of an optical component of the multifocal structure 260. The pixel level polarizer 300 is positioned to receive light emitted from the electronic display 255. The pixel level polarizer 300 polarizes light emitted from each pixel of the electronic display 255. Depending on the type of electronic display 255, the light emitted from the electronic display 255 may be polarized or unpolarized. The pixel level polarizer 300 receives light from each pixel of the electronic display 255, and is optically matched to the emitted light to transmit a portion of the light as linearly polarized light 302 aligned along 45 degrees and a portion of the light as linearly polarized light 304 aligned along 135 degrees.

The pixel level polarizer may include a plurality of cells 330. Each cell 330 receives light from one or more pixels of the electronic display 255, and transmit the light as linearly polarized light along the first or second direction. The light transmitted from adjacent cells 330 of the pixel level polarizer 300 may have polarizations aligned tangentially from each other. The linearly polarized light 302 and linearly polarized light 304 provide two image planes that can take different optical paths through the multifocal structure 260.

FIG. 3B illustrates pixel level polarizer 350, in accordance with one embodiment. The pixel level polarizer 350 is another embodiment of the pixel level polarizer 300 that can be positioned to receive light emitted from the electronic display 255. The pixel level polarizer 350 polarizes light emitted from each pixel of the electronic display in orientations different from the orientations of the pixel level polarizer 300. The pixel level polarizer 350 transmit linearly polarized light 352 aligned along 90 degrees and linearly polarized light 354 aligned along 0 degrees. The other optical components may be aligned accordingly to accommodate the 0 and 90 degree alignments output from the pixel level polarizer 350, or some other (e.g., tangential) alignment along other axes.

In some embodiments, the pixel level polarizer 300/350 has a first configuration that causes the pixel level polarizer 300/350 to linearly polarize light in a first direction and a second configuration that causes the pixel level polarizer 300/350 to linearly polarize light in a second direction that is different than the first direction. The multifocal structure 260 is configured to output image light at different focal distances based in part on the configuration of the pixel level polarizer.

In some embodiments, the pixel level polarizer 300/350 includes at least a first set and a second set of cells 330, and the pixel level polarizer has a third configuration that causes the pixel level polarizer to linearly polarize light passing through the first set of cells 330 in the first direction and to linearly polarize light passing through the second set of cells 330 in the second direction. For example, the first set of cells 330 of the pixel level polarizer 300 may include cells that output the linearly polarized light 302 aligned along 45 degrees and the second set of cells 330 may include cells that output the linearly polarized light 304 aligned along 135 degrees. The first and second set of cells 330 may be arranged in alternating patterns across the pixel level polarizer. In another example, the pixel level polarizer selectively causes each cell to linearly polarize light in either the first direction or second direction. In some embodiments, the first set of cells of the pixel level polarizer 350 may include cells that output the linearly polarized light 352 aligned along 90 degrees and the second set of cells may include cells that output the linearly polarized light 354 aligned along 0 degrees.

In some embodiments, the configuration of each cell of a pixel level polarizer may be set by a focus signal. The focus signal may provide for a cell-by-cell addressing and selection for orientations of light emitted from each cell 330 of the pixel level polarizer. The pixel level polarizer may include a layer of liquid crystals that form the cells 330. The liquid crystals of a cell 330 change their orientation based on the focus signal to control the orientation of linear light emitted from the cell 330, which results in different orientations of linear light being transmitted through the liquid crystals.

In some embodiments, the cells 330 are defined by a mask having a fixed arrangement of liquid crystals to transmit light at the first and second directions. Here, adjacent cells 330 may transmit light in tangential directions. The mask may be coupled to or formed on a display surface of the electronic display 255.

FIG. 4A illustrates a liquid crystal lens 400, according to an embodiment. The LC lens 400 is an example of a LC lens element of the multifocal structure 260. The LC lens 400 has two states: an additive state (with positive focus of "f") and a neutral state. In either state, the LC lens 400 can receive incident right circularly polarized light 402 or incident left circularly polarized light 404, and outputs light without changing the polarization of the incident light.

Figure 4B:
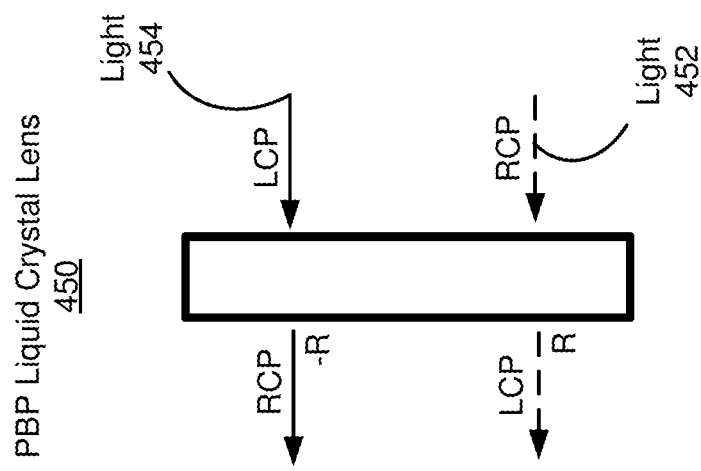
FIG. 4B illustrates a Pancharatnam Berry Phase (PBP) liquid crystal lens, according to one embodiment.

FIG. 4B illustrates a Pancharatnam Berry Phase (PBP) liquid crystal lens 450, according to an embodiment. The PBP liquid crystal lens 450 (or "PBP lens 450") is another example of the LC lens element of the multifocal structure 260. The PBP lens 450 has three states: an additive state, a subtractive state, and a neutral state. In an additive state, the PBP lens 450 adds optical power R and has a positive focus of "f," where R (step resolution) is a positive number (e.g., 0.1, 0.25, 0.5 etc.). Conversely, in a subtractive state, the PBP lens 450 subtracts—R of optical power and has a negative focus of '−f." In the neutral state, the PBP lens 450 does not add or subtract optical power. The additive and subtractive states are also referred to as active states because the PBP lens 450 changes the optical power of incident light.

The state of the PBP lens 450 is determined by whether the incident light has left circular polarization (LCP) or right circular polarization (RCP), and applied voltage. The PBP lens 450 operates in the additive state (f) responsive to incident light 452 with a right handed circular polarization and an applied voltage of zero (or more generally below some minimal value), operates in the subtractive state (−f) responsive to incident light 404 with a left handed circular polarization and the applied voltage of zero (or more generally below some minimal value), and operates in a neutral state (0) (regardless of polarization) responsive to an applied voltage larger than a threshold voltage which aligns liquid crystal with positive dielectric anisotropy along with the electric field direction. Note that if the PBP lens 450 is in the additive or subtractive state, light output from the PBP lens 450 has a handedness opposite that of the light input into the PBP lens 450. In contrast, if the PBP lens 450 is in the neutral state, light output from the PBP lens 450 has the same handedness as the light input into the PBP lens 400.

In some embodiments, the PBP lens 450 is a passive PBP liquid crystal lens having two optical states, specifically, the additive state and the subtractive state. The state of a passive PBP lens 450 is determined by the handedness of polarization of light incident on the passive PBP lens 450. A passive PBP liquid crystal lens operates in a subtractive state responsive to incident light with a left handed polarization and operates in an additive state responsive to incident light with a right handed polarization. Note that the passive PBP lens 450 outputs light that has a handedness opposite that of the light input into the passive PBP lens 450 lens.

In some embodiments, the LC lens element of the multifocal structure 260 may include a series of LC lenses and/or PBP lenses. Each lens can be placed in various states, with combinations of states producing different combined optical powers.

FIG. 5A is an example PBP lens 500, according to an embodiment. The PBP lens 500 is an example of a PBP lens 450 shown in FIG. 4B. The PBP lens 500 creates a respective lens profile via an in-plane orientation (Θ, azimuth angle) of a liquid crystal molecule, in which the phase difference T=2Θ. In contrast, a (non-PBP) liquid crystal lens creates a lens profile via a birefringence (Δn) and layer thickness (d) of liquid crystals, and a number (#) of Fresnel zones (if it is Fresnel lens design), in which the phase difference T=Δnd*#*2π/λ. Accordingly, in some embodiments, a PBP lens 500 may have a large aperture size and can be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g., ±2 Diopters or more), fast switching speeds (e.g., ~300 ms), and a good quality image. The PBP lens may be desirable over other types of liquid crystal lenses having relatively high index of refraction or be relatively larger thick (which reduces switching speeds). The PBP liquid includes a liquid crystal having a relatively low index of refraction, is thin (e.g., a single liquid crystal layer can be ~2 μm), and has high switching speeds (e.g., 300 ms).

FIG. 5B is an example of liquid crystal orientations 510 in the PBP lens 500 of FIG. 5A, according to an embodiment. In the PBP lens 500, an azimuth angle (Θ) of a liquid crystal molecule is continuously changed from a center 520 of the PBP lens 500 to an edge 530 of the PBP lens 500, with a varied pitch Λ. Pitch is defined in a way that the azimuth angle of LC is rotated 180° from the initial state.

FIG. 5C is a section of liquid crystal orientations 540 taken along a y axis in the PBP lens 500 of FIG. 5A, according to an embodiment. The liquid crystal orientation 540 has a rate of pitch variation as a function of distance from the lens center 520. The rate of pitch variation increases with distance from the lens center. For example, pitch at the lens center ($\Lambda_0$), is the slowest and pitch at the edge 520 ($\Lambda_r$) is the highest, i.e., $\Lambda_0 > \Lambda_1 > \ldots > \Lambda_r$. In the x-y plane, to make a PBP lens with lens radius (r) and lens power (+/−f), the azimuth angle needs to meet: $2\Theta = r^2/f^*(\pi/\lambda)$, where λ is the wavelength of light. Along with the z-axis, a dual twist or multiple twisted structure layers offers achromatic performance on efficiency in the PBP lens 500. Along with the z-axis, the non-twisted structure is simpler to fabricate then a twisted structure, but is optimized for a monochromatic light.

Note that a PBP lens may have a twisted or non-twisted structure. In some embodiments, a LC lens element may include one or more PBP lenses having a twisted structure, one or more PBP lenses having a non-twisted structure, or some combination thereof.

Figure 6:
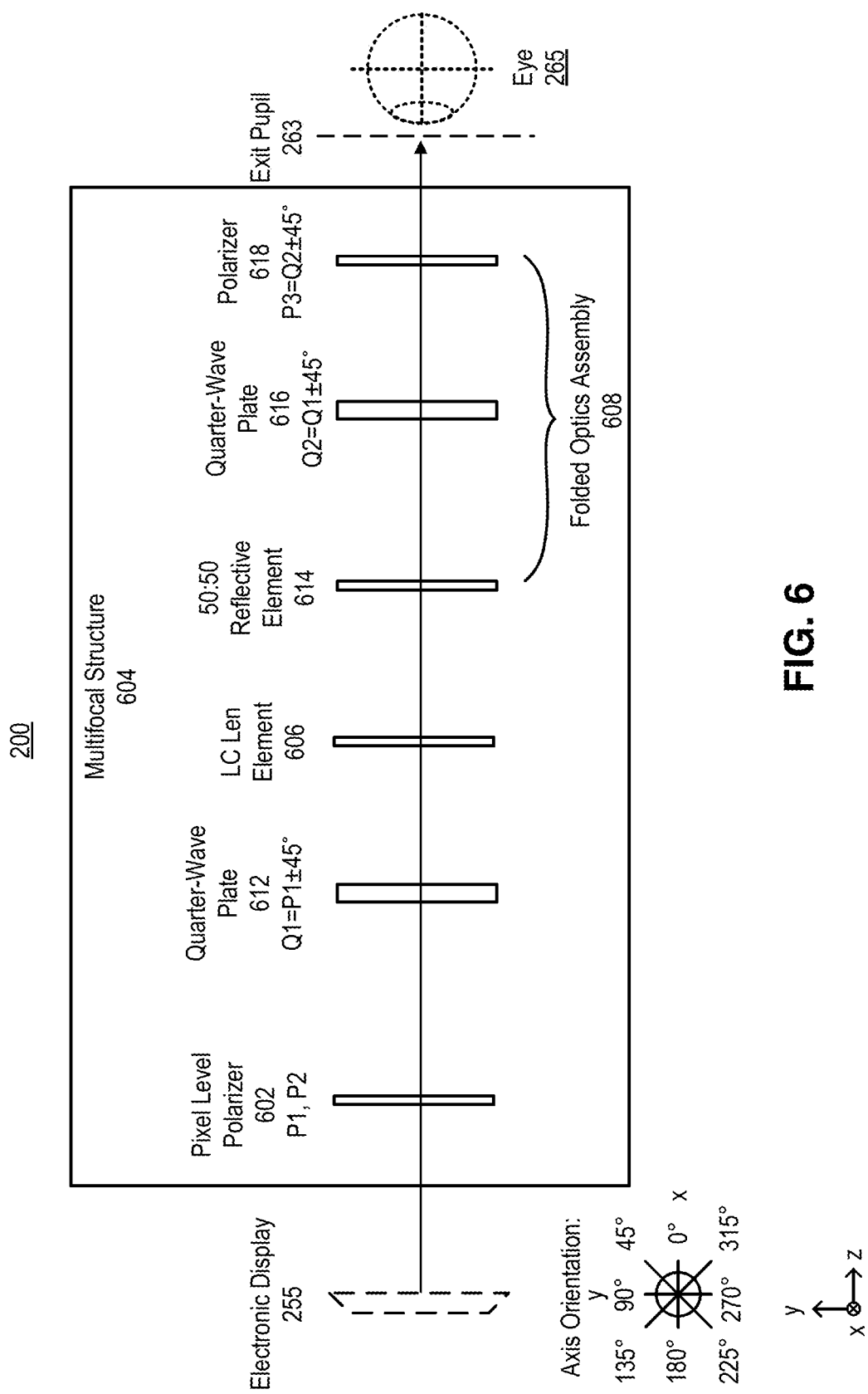
FIG. 6 illustrates optical components of an HMD including a multifocal structure, according to one embodiment

FIG. 6 illustrates optical components of an HMD 200 including a multifocal structure 604, according to one embodiment. The multifocal structure 604 is an embodiment of the multifocal structure 260. The multifocal structure 604 includes a pixel level polarizer 602, a quarter wave plate (QWP) 612, a LC lens element 606, and a folded optics assembly 608. Image light emitted from pixels of the electronic display 255 propagate along a z-axis in a Cartesian coordinate system toward the exit pupil 263. The multifocal structure 604 receives light emitted from the pixels of the electronic display 255, and outputs light associated with each pixel at one of multiple focal distances at the exit pupil 263. In some embodiments, multifocal structure 604 provides for four different selectable focal distances.

The pixel level polarizer 602 is positioned in front of the electronic display 255 (e.g., along the Z axis, from the perspective of the eye 265) to polarize light emitted from each pixel of the electronic display 255 in two polarizations defined as P1 and P2, respectively. For example, P1 may be linear light aligned along a first axis, and P2 may be linear light aligned along a second axis. The first and second axes may be orthogonal to each other. For example, the first axis may be aligned along 45 degrees and the second axis may be aligned along 135 degrees. In another example, the first axis is aligned along 0 degrees and the second axis is aligned along 90 degrees.

The LC lens element 606 may be a PBP lens 450 having an additive state that adds optical power and changes the polarization of incident circularly light, a subtractive state that subtracts optical power and changes the polarization of incident circularly light, and a neutral state that does not change the optical power or polarization of incident light. In other embodiments, the LC lens element 606 may be the LC lens 400 having an additive state that adds optical power and does not change the polarization of incident circularly polarized light, and a neutral state that does not change the optical power or polarization of incident light. The QWP 612 receives linearly polarized light emitted from the pixel level polarizer 602, and converts the linearly polarized light into a circularly polarized light for the LC lens element 606.

The folded optics assembly 608 cause the light output from the LC lens element 606 to take either a direct path or a folded path through the multifocal structure 604 based on a polarization of the light. The folded optics assembly 608 includes a 50:50 reflective element 614, a QWP 616, and a polarizer 618.

The LC lens element 606 can control whether light takes the direct or folded path based on outputting the light at different (e.g., circular left or right) polarizations. Light propagating along the direct path through the multifocal structure 604 propagates along the z-axis in a direction from the electronic display 255 toward the exit pupil 263. Light propagating along the folded path also propagates from the electronic display 255 toward the exit pupil 263, but takes a bi-directional path within the folded optics assembly 608 that includes propagation along the z-axis in a first direction from the electronic display 255 toward the exit pupil 263, and a second direction from the exit pupil 263 toward the electronic display 255. As such, the folded path provides a larger focal distance for light than the direct path. Multiple optical paths for the multifocal structure 604 are discussed in detail below with regard to FIGS. 7A through 9. By controlling the operation of the pixel level polarizer 602 and the LC lens element 606, the multifocal structure 604 selectively outputs light from the electronic display 255 at 4 different focal distances.

The optical components of the multifocal structure 604 are not necessarily arranged in the order shown in FIG. 6. For example, multiple focal distances can also be achieved by placing the LC lens element 606 between the 50:50 reflective element 614 and the QWP 616.

The QWPs 612 and 616 convert incident linearly polarized light into circularly polarized light, and vice versa. The orientation of an optic axis relative to the axis orientation incident linearly polarized light controls the handedness of the emitted circularly polarized light. Similarly, the handedness of incident circularly polarized light controls orientation of linearly polarized light output by the QWPs 612 and 616.

The 50:50 reflective element 614 transmits a portion of incident light and reflect a portion of incident light (e.g., without changing polarization of the light). The 50:50 reflective element 614 may reflect 50% of incident light and transmit the remaining 50% of incident light. A partially reflective mirror transmits some percentage of incident light and reflects the remaining percentage of incident light regardless of polarization.

The polarizer 618 linearly polarizes light in accordance with the orientation of its polarization axis. The polarizer 618 may be, for example, a reflective polarizer, a linear polarizing beam splitter, or some other optical element that linearly polarizes light. A reflective polarizer polarizes light in accordance with its associated axis orientation. For example, a polarizer passes incident light whose electric field component is aligned with an axis orientation of the reflective polarizer, and reflects light whose electric field component is orthogonal to the axis orientation of the reflective polarizer. A linear polarizing beam splitter splits light into two beams whose respective electric field components are linearly polarized. In some embodiments, one of the beams output from the linear polarizing beam splitter is blocked (e.g., via baffles, some type of light absorptive mechanism, etc.).

Although illustrated as being flat and separate elements, some or all of the optical elements (e.g., the polarizer 618, the QWPs 612 and 616, and the 50:50 reflective element 614) may be coatings on optical surfaces that are curved to add optical power to a system (e.g., a system including the front rigid body 105 including the electronic display 255 and the multifocal structure 604).

With reference to an orientation coordinate circle illustrated at a left hand side of FIG. 6, the QWP 612 has an optic axis Q1 which is ±45 degrees relative to the polarization axis P1 (or alternatively P2) of the pixel level polarizer 602. The QWP 616 has an optic axis Q2 which is ±90 degrees relative to the optic axis Q1 of the QWP 612. The polarizer 618 has a polarization axis P3 which is ±45 degrees relative to the optic axis Q2 of the QWP 616.

In some embodiments, the axes P1 and P2 of the pixel level polarizer 602 are aligned along 45 degrees and 135 degrees, respectively, and the optic axis Q1 of the QWP 612 is aligned along 0 degrees, the optic axis Q2 of the QWP 616 is aligned along 90 degrees, and the polarization axis P3 is aligned along 135 degrees.

In other embodiments, the axes P1 and P2 of the pixel level polarizer 602 are aligned, respectively, along 45 degrees and 135 degrees, the optic axis Q1 of the QWP 612 is aligned along 0 degrees, the optic axis Q2 of the QWP 616 is aligned along 90 degrees, and the polarization axis P3 is aligned along 45 degrees.

An eye tracking system controls the operation of the multifocal structure 604 by generating and sending focus instructions to the pixel level polarizer 602 and/or LC lens element 606. The focus instructions may cause the pixel level polarizer 602 to selectively output light at different orientations for each cell of the pixel level polarizer 602. The focus instructions may also cause the LC lens element 606 to switch between states (e.g., additive, subtractive, or neutral). The eye tracking system may be integrated within the HMD 200, or separate from the HMD 200.

FIGS. 7A-7D illustrates various optical paths within a multifocal structure (e.g., the multifocal structure 604), in accordance to one embodiment. The optical paths are shown for a configuration of the HMD 200 where the LC lens element 606 is a PBP lens 450, the axis P1 of the pixel level polarizer 602 are aligned along 45 degrees, the axis P2 of the pixel level polarizer 602 is aligned along 135 degrees, the optic axis Q1 of the QWP 612 is aligned along 0 degrees, the optic axis Q2 of the QWP 616 is aligned along 90 degrees, and the polarization axis P3 of the polarizer 618 is aligned along 135 degrees. As discussed above, the PBP lens 450 can be placed in different states for different polarizations of light output from the pixel level polarizer 602, resulting in multiple optical paths. The optical paths include direct paths and folded paths through the folded optics assembly 608, with different levels of optical power addition or subtraction by the PBP lens 450. Table 1 shown below illustrates four states of the multifocal structure that result in four different focal distances of the multifocal structure—and each focal distance is associated with a respective image plane. The associated optical path for image planes 1 through 4 are respectively shown in FIGS. 7A through 7D.

TABLE 1

Four states of the multifocal structure 604 including PBP lens 450 that result in four different focal distances.

| Image Plane | Pixel Level Polarizer | PBP Lens Optical Power | Folded Path |
|---|---|---|---|
| 1 | Linear 45° | 0 | Y |
| 2 | Linear 45° | f | N |
| 3 | Linear 135° | −f | Y |
| 4 | Linear 135° | 0 | N |

Figure 7A:
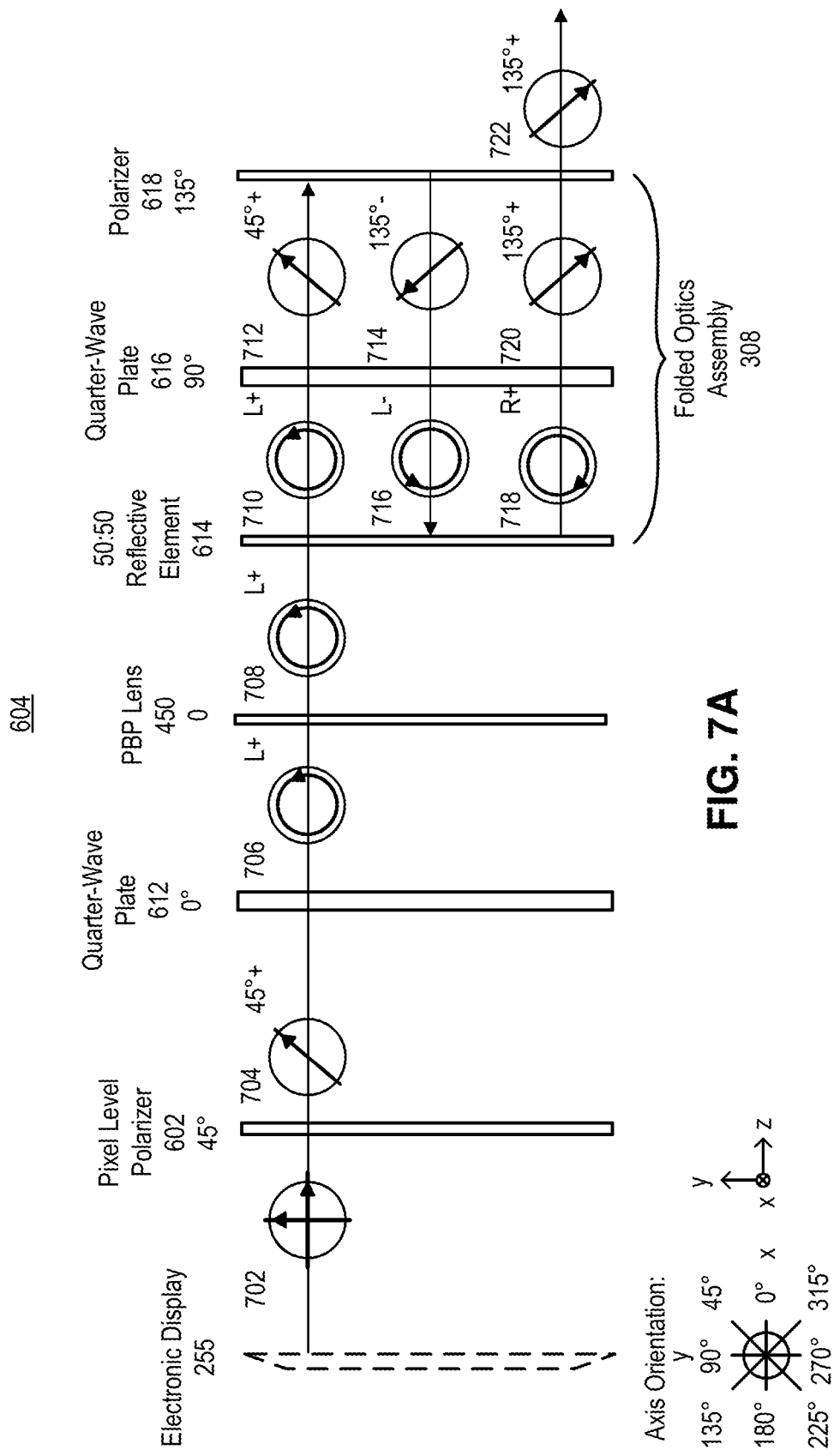
FIG. 7A illustrates an optical path within the multifocal structure of FIG. 6, according to one embodiment.

FIG. 7A illustrates a first optical path in a multifocal structure (e.g., the multifocal structure 604), according to one embodiment. The first optical path corresponds with image plane 1 shown in Table 1. Orientation blocks are illustrated between each of the optical components. The orientation blocks illustrate an orientation of light between the optical components. The optical path traverses along the z-axis, with polarization orientation defined along the x-y axes (with reference to an orientation coordinate circle illustrated at a left hand side of the figure).

The electronic display 255 generates an image light 702, and provides the image light 702 to the pixel level polarizer 602. The image light 702 may be unpolarized light. The pixel level polarizer 602 has a configuration that transmits a portion of the image light 702 as linearly polarized light 704 oriented along 45 degrees. The linearly polarized light 704 propagates to the QWP 612. The QWP 612 converts the linearly polarized light 704 into left circularly polarized light (LCP) 706.

To produce the image plane 1, the PBP lens 450 is set to the neutral state. The PBP lens 450 can be set to the neutral state by applying a voltage to the PBC lens 450 that is larger than a threshold voltage. The neutral state results in the PBP lens 450 neither adding nor subtracting optical power ("0"), and the PBP lens 450 also does not change the polarization of the incident LCP light 706. As such, the PBP lens 450 transmits the incident light as LCP light 708.

The LCP light 708 propagates to the folded optics assembly 608, and takes a folded path through the folded optics assembly 608 because of the left circular polarization. The folded assembly 608 includes the 50:50 reflective element 614, the QWP 616, and the polarizer 618. The polarizer 618 has a polarization axis aligned along 135 degrees, and thus transmits linearly polarized light oriented along 135 degrees and reflects linearly polarized light oriented along 45 degrees.

The 50:50 reflective element 614 reflects 50% of the incident LCP light 708, and transmits 50% of the LCP light 708 as LCP light 710 propagating in the +z direction. The QWP 616 converts the incident LCP light 710 into linearly polarized light 712 oriented along 45 degrees propagating in the +z direction. The polarizer 618 reflects the linearly polarized light 712 as linearly polarized light 714 oriented along 135 degrees propagating in the −z direction. The QWP 616 converts the incident linearly polarized light 714 into LCP light 716 propagating in the −z direction. The 50:50 reflective element 614 transmits 50% of the incident LCP light 716, and reflects 50% of the incident LCP light 716 as right circular polarized (RCP) light 718 propagating in the +z direction. The QWP 616 converts the incident RCP light 718 into linearly polarized light 720 oriented along 135 degrees and propagating in the +z direction. The polarizer 618 transmits the linearly polarized light 720 as linearly polarized light 722 oriented along 135 degrees and propagating out of the folded optics assembly 608 in the +z direction.

Figure 7B:
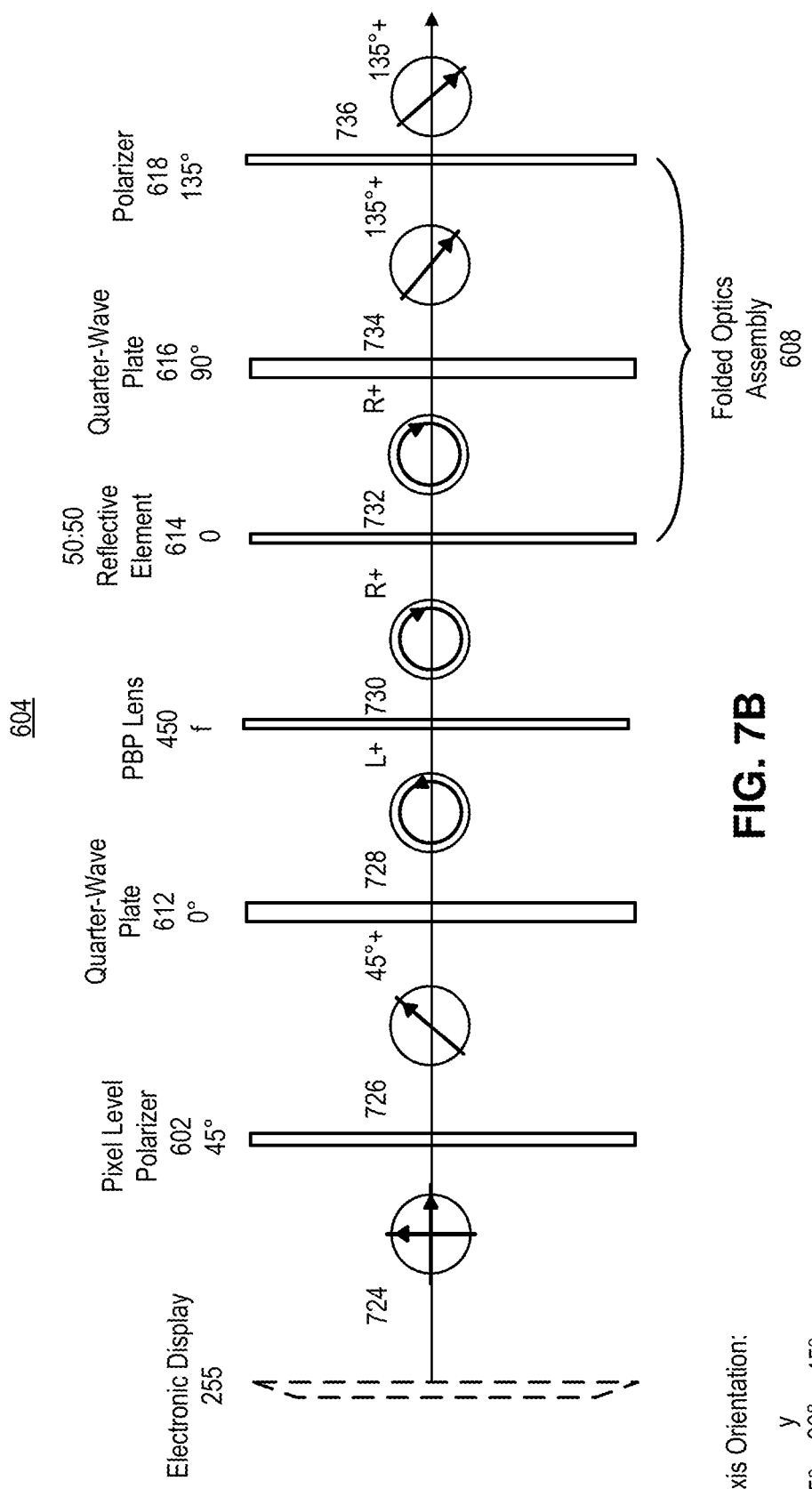
FIG. 7B illustrates a second optical path within the multifocal structure of FIG. 6, according to one embodiment.

FIG. 7B illustrates a second optical path in the multifocal structure (e.g., the multifocal structure 604), according to one embodiment. The second optical path corresponds with image plane 2 shown in Table 1. The electronic display 255 generates an image light 724, and provides the image light 724 to the pixel level polarizer 602. The pixel level polarizer 602 has a configuration that transmits a portion of the image light 724 as linearly polarized light 726 oriented along 45 degrees. The linearly polarized light 726 propagates to the QWP 312. The QWP 312 converts the linearly polarized light 704 into LCP light 728.

To produce the image plane 2, the PBP lens 450 is set to an active state. The PBP lens 400 is set to the active state by applying a voltage to the PBP lens 450 that is below a threshold voltage (or not applying a voltage). In the active state, the PBP lens 450 converts the LCP light 728 into RCP light 730. The orientation of the incident LCP light 728, and the PBP lens 450 being in the active state, results in the PBP lens 450 having increased optical power ("f"), and changes the polarization of the incident LCP light 728.

The RCP light 730 propagates to the folded optics assembly 608, and takes a direct path through the folded optics assembly 608 because of the right circular polarization. The 50:50 reflective element 614 reflects 50% of the incident RCP light 730, and transmits 50% of the RCP light 730 as RCP light 732 propagating in the +z direction. The QWP 616 converts the incident RCP light 732 into linearly polarized light 734 oriented along 135 degrees propagating in the +z direction. The polarizer 618 transmits the linearly polarized light 734 as linearly polarized light 736 oriented along 135 degrees and propagating out of the folded optics assembly 608 in the +z direction. The differences in the optical paths shown in FIGS. 7A and 7B result in different focal distances and image planes. In some embodiments, one or more optical components of the multifocal structure 260 may be curved to further add or subtract optical power.

Figure 7C:
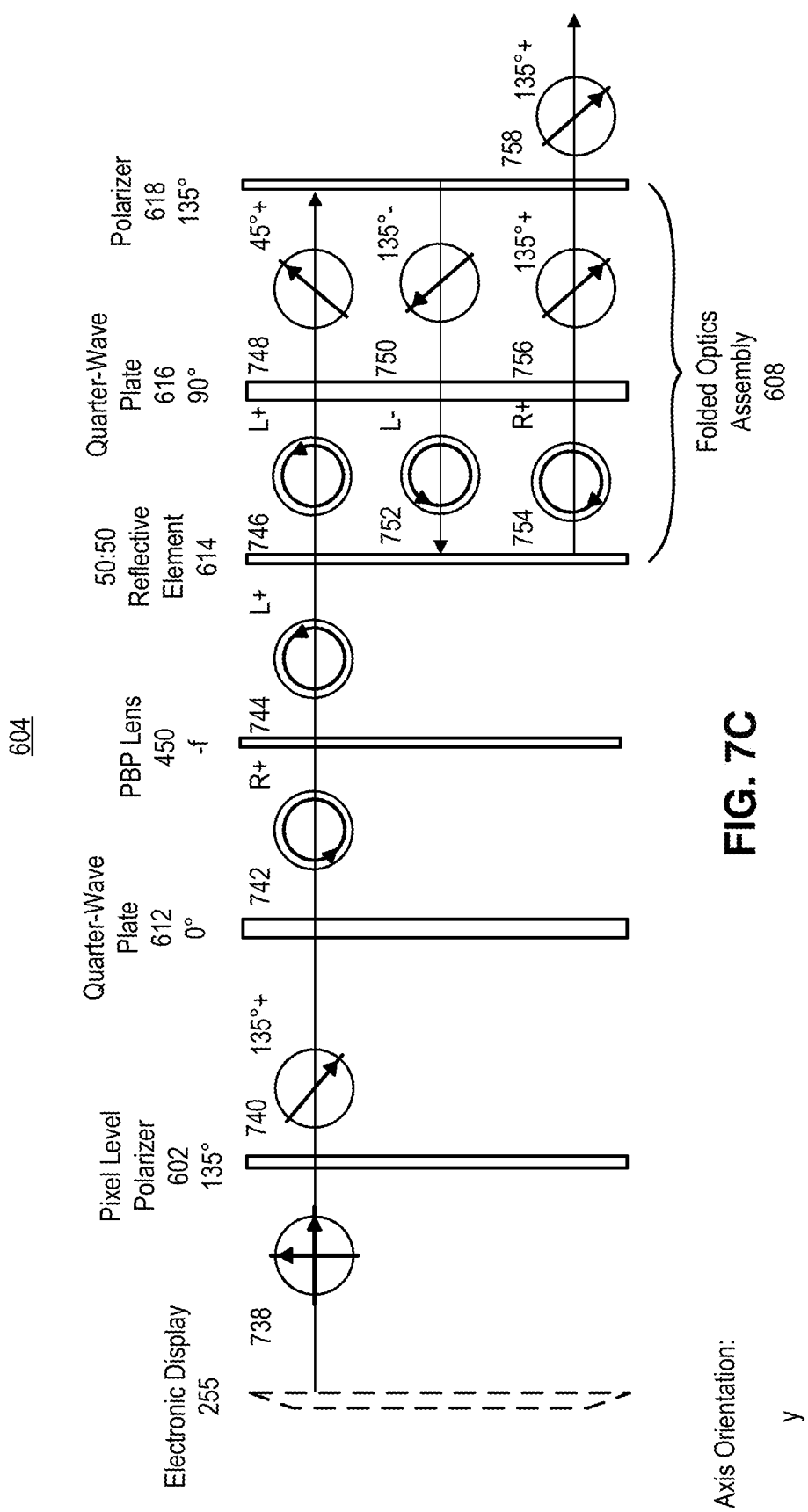
FIG. 7C illustrates a third optical path within the multifocal structure of FIG. 6, according to one embodiment.

FIG. 7C illustrates a third optical path in the multifocal structure (e.g., multifocal structure 260), according to one embodiment. The third optical path corresponds with image plane 3 shown in Table 1. The electronic display 255 generates an image light 738, and provides the image light 738 to the pixel level polarizer 602. The pixel level polarizer 602 transmits a portion of image light 738 as linearly polarized light 740 oriented along 135 degrees. The linearly polarized light 740 propagates to the QWP 312. The QWP 312 converts the linearly polarized light 740 into RCP light 742.

To produce the image plane 3, the PBP lens 450 is set to the active state. The PBP lens 450 is set to the active state by applying a voltage to the PBC lens 450 that is below a threshold voltage (or not applying a voltage). In the active state, the PBP lens 450 converts the RCP light 742 into LCP light 744. The orientation of the incident RCP light 742 and the PBC lens 450 being in the active state results in the PBP lens 450 having decreased optical power ("−f"), and changing the polarization of the incident light.

The LCP light 744 propagates to the folded optics assembly 608, and takes a folded path through the folded optics assembly 608 because of the left circular polarization. The 50:50 reflective element 614 reflects 50% of the incident LCP light 744, and transmits 50% of the LCP light 744 as LCP light 746 propagating in the +z direction. The QWP 616 converts the incident LCP light 746 into linearly polarized light 748 oriented along 45 degrees propagating in the +z direction. The polarizer 618 reflects the linearly polarized light 748 as linearly polarized light 750 oriented along 135 degrees propagating in the −z direction. The QWP 616 converts the incident linearly polarized light 750 into LCP light 752 propagating in the −z direction. The 50:50 reflective element 614 transmits 50% of the incident LCP light 752, and reflects 50% of the incident LCP light 752 as right circular polarized (RCP) light 754 propagating in the +z direction. The QWP 616 converts the incident RCP light 754 into linearly polarized light 756 oriented along 135 degrees and propagating in the +z direction. The polarizer 618 transmits the linearly polarized light 756 as linearly polarized light 758 oriented along 135 degrees and propagating out of the folded optics 608 in the +z direction. The difference in optical power provided by the PBP lens 450 in FIG. 7C compared with the PBP lens 450 in FIG. 7A results in a different image planes for the multifocal structure 604 even though both the optical paths include folded paths through the folded optics assembly 608.

Figure 7D:
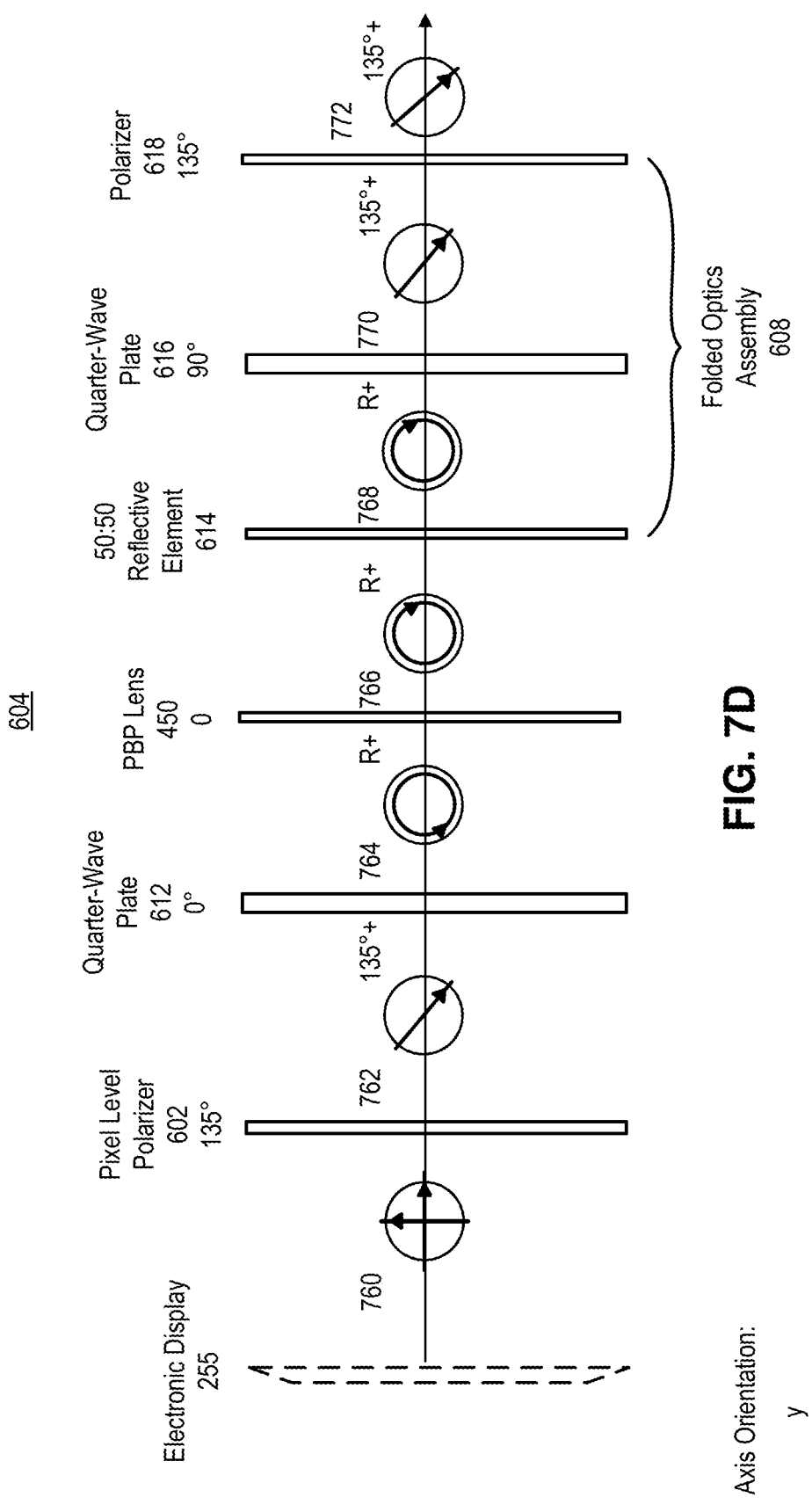
FIG. 7D illustrates a fourth optical within the multifocal structure of FIG. 6, according to one embodiment.

FIG. 7D illustrates a fourth optical path in the multifocal structure (e.g., multifocal structure 604), according to one embodiment. The fourth optical path corresponds with image plane 4 shown in Table 1. The electronic display 255 generates an image light 760, and provides the image light 760 to the pixel level polarizer 602. The pixel level polarizer 602 transmits a portion of the image light 760 as linearly polarized light 762 oriented along 135 degrees. The linearly polarized light 762 propagates to the QWP 612. The QWP 612 converts the linearly polarized light 762 into RCP light 764.

To produce the image plane 4, the PBP lens 450 is set to the neutral state. The neutral state results in the PBP lens 450 neither adding nor subtracting optical power ("0"), and the PBP lens 450 also does not change the polarization of the incident RCP light 764. As such, the PBP lens 450 passes the incident light as RCP light 766.

The RCP light 766 propagates to the folded optics assembly 608, and takes a direct path through the folded optics assembly 608 because of the right circular polarization. The 50:50 reflective element 614 reflects 50% of the incident RCP light 766, and transmits 50% of the RCP light 766 as RCP light 768 propagating in the +z direction. The QWP 616 converts the incident RCP light 768 into linearly polarized light 770 oriented along 135 degrees and propagating in the +z direction. The polarizer 618 transmits the linearly polarized light 770 as linearly polarized light 772 oriented along 135 degrees and propagating out of the folded optics 308 in the +z direction. The difference in optical power provided by the PBP lens 450 in FIG. 7D compared with the PBP lens 450 in FIG. 7B results in a different image planes for the multifocal structure 604 even though both the optical paths include direct paths through the folded optics assembly 608.

Table 2 shown below illustrates four states of a multifocal structure (e.g., multifocal structure 604) that result in four different focal distances of the multifocal structure, where the multifocal structure 604 includes a LC lens 400 for the LC lens element 606 to create four different focal distances, and thus four different image planes.

TABLE 2

Four states of the multifocal structure 604 including LC lens 400 that result in four different focal distances.

| Image Plane | Pixel Level Polarizer | Non-PBP Lens Optical Power | Folded Path |
|---|---|---|---|
| 1 | Linear 45° | f | Y |
| 2 | Linear 45° | 0 | Y |
| 3 | Linear 135° | f | N |
| 4 | Linear 135° | 0 | N |

FIG. 8 illustrates an optical path in a multifocal structure (e.g., multifocal structure 604) including the LC lens 400, according to one embodiment. The optical path corresponds with image plane 1 shown in Table 2. The electronic display 255 generates an image light 802, and provides the image light 802 to the pixel level polarizer 602. The pixel level polarizer 602 transmits a portion of the image light 802 as linearly polarized light 804 oriented along 45 degrees. The linearly polarized light 804 propagates to the QWP 612. The QWP 612 converts the linearly polarized light 804 into LCP light 806.

To produce the image plane 1 of Table 3, the LC lens 400 is set to the additive state ("f"). The additive state causes the LC lens 400 to add optical power, and the LC lens 400 does not change the polarization of the incident light. As such, the LC lens 400 transmits the incident LCP light 806 as LCP light 808.

The LCP light 808 propagates to the folded optics assembly 608, and takes a folded path through the folded optics assembly 608 because of the left circular polarization. The 50:50 reflective element 614 reflects 50% of the incident LCP light 808, and transmits 50% of the LCP light 808 as LCP light 810 propagating in the +z direction. The QWP 616 converts the incident LCP light 810 into linearly polarized light 812 oriented along 45 degrees propagating in the +z direction. The polarizer 618 reflects the linearly polarized light 812 as linearly polarized light 814 oriented along 135 degrees propagating in the –z direction. The QWP 616 converts the incident linearly polarized light 814 into LCP light 816 propagating in the –z direction. The 50:50 reflective element 614 transmits 50% of the incident LCP light 816, and reflects 50% of the incident LCP light 816 as RCP light 818 propagating in the +z direction. The QWP 616 converts the incident RCP light 818 into linearly polarized light 820 oriented along 135 degrees and propagating in the +z direction. The polarizer 618 transmits the linearly polarized light 820 as linearly polarized light 822 oriented along 135 degrees and propagating out of the folded optics assembly 608 in the +z direction to provide the image plane 1.

With reference to Table 3, the image plane 2 is produced by setting the LC lens 400 in the neutral state. The LC lens 400 does not change the polarization of incident light in the neutral or additive state, and thus the linearly polarized 45 degree light output from the pixel level polarizer 602 takes the folded path through the folded optics assembly 608. The image planes 3 and 4 can be produced by linearly polarized 135 degree light output from the pixel level polarizer 602 taking the direct path through the folded optics assembly 608 and the LC lens 400 providing different optical powers, such as additive for the image plane 3 and neutral for the image plane 4

As discussed above for the multifocaul structure 604 shown in FIG. 6, the polarizer 618 has a polarization axis P3 which is ±45 degrees relative to the optic axis Q2 of the QWP 616. In the examples discussed above, the optic axis Q2 is 90 degrees and the polarization axis P3 is 135 degrees. In the example of Table 3 and FIG. 11 discussed below, the polarization axis P3 is 45 degrees. Here, the polarizer 618 transmits incident linearly polarized light aligned along 45 degrees and reflects incident linearly polarized light aligned along 135 degrees.

Table 3 shown below illustrates four states of the multifocal structure 604 when polarizer 618 aligned along 45 degrees and the LC lens element 606 is a PBP lens 450. This configuration also results in four different focal distances, and thus four different image planes.

TABLE 3

Four states of the multifocal structure 604 including PBP lens 450 that result in four different focal distances.

| Image Plane | Pixel Level Polarizer | PBP LC Lens Optical Power | Folded Path |
|---|---|---|---|
| 1 | Linear 45° | f | Y |
| 2 | Linear 45° | 0 | N |
| 3 | Linear 135° | –f | Y |
| 4 | Linear 135° | 0 | N |

Figure 9:
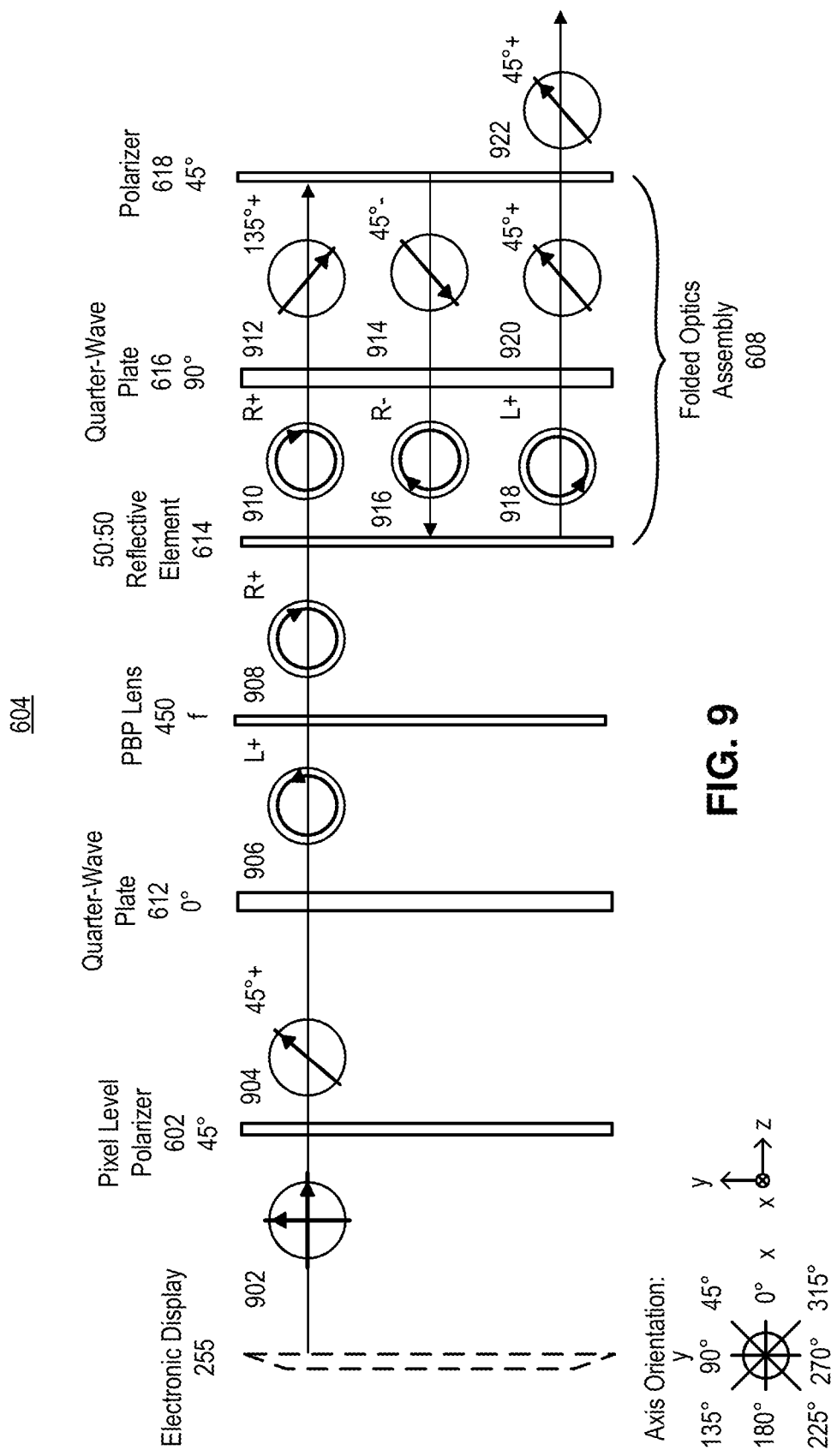
FIG. 9 illustrates an optical path in the multifocal structure shown in FIG. 6, according to one embodiment.

FIG. 9 illustrates an optical path in the in a multifocal structure (e.g., multifocal structure 604) having a polarizer 618 aligned along 45 degrees and a PBP lens 450, according to one embodiment. The optical path corresponds with image plane 1 shown in Table 3. The electronic display 255 generates an image light 902, and provides the image light 902 to the pixel level polarizer 602. The pixel level polarizer 602 transmits a portion of the image light 902 as linearly polarized light 904 oriented along 45 degrees. The linearly polarized light 904 propagates to the QWP 612. The QWP 612 converts the linearly polarized light 904 into LCP light 906.

To produce the image plane 1 of Table 3, the PBP lens 450 is set to the active state. The orientation of the incident LCP light 906 and the active state causes the PBP lens 400 to add optical power ("f"), and the PBP lens 450 also changes the polarization of the incident light. As such, the PBP lens 450 transmits the incident LCP light 906 as RCP light 908.

The RCP light 908 propagates to the folded optics assembly 608, and takes a folded path through the folded optics assembly 608 because of the right circular polarization. The 50:50 reflective element 614 reflects 50% of the incident RCP light 908, and transmits 50% of the RCP light 908 as RCP light 910 propagating in the +z direction. The QWP 616 converts the incident RCP light 910 into linearly polarized light 912 oriented along 135 and degrees propagating in the +z direction. The polarizer 618 now has a polarization axis aligned along 45 degrees, and thus reflects the linearly polarized light 912 as linearly polarized light 914 oriented along 45 degrees propagating in the −z direction. The QWP 616 converts the incident linearly polarized light 914 into RCP light 916 propagating in the −z direction. The 50:50 reflective element 614 transmits 50% of the incident RCP light 916, and reflects 50% of the incident RCP light 916 as LCP light 918 propagating in the +z direction. The QWP 616 converts the incident LCP light 918 into linearly polarized light 920 oriented along 45 degrees and propagating in the +z direction. The polarizer 618 transmits the linearly polarized light 920 as linearly polarized light 922 oriented along 45 degrees and propagating out of the folded optics assembly 608 in the +z direction to provide the image plane 1.

With reference to Table 3, the image plane 2 is produced by setting the PBP lens 450 in the neutral state. The PBP lens 450 does not change the polarization of incident light in the neutral state, and thus the linearly polarized 45 degree light output from the pixel level polarizer 602 takes the direct path through the folded optics assembly 608.

The image planes 3 and 4 can be produced by linearly polarized 135 degree light output from the pixel level polarizer 602, with the PBP lens 450 respectively in the active (resulting in subtract power ("−f")) and neutral states.

Figure 10:
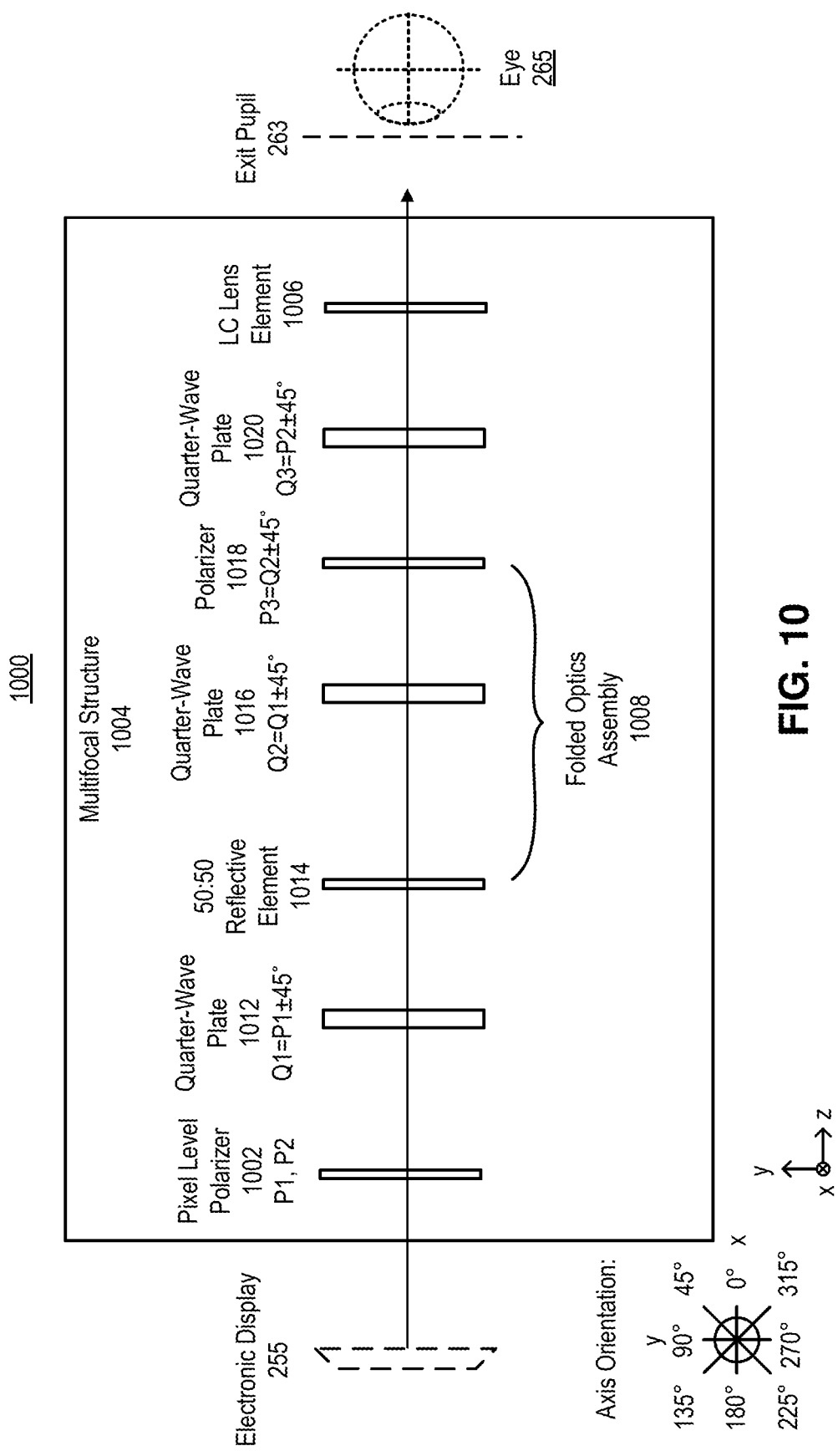
FIG. 10 illustrates optical components of an HMD including a multifocal structure, according to one embodiment.

FIG. 10 illustrates optical components of an HMD 1000 including a multifocal structure 1004, according to one embodiment. The HMD 1000 is am embodiment of the HMD 200 discussed above. The HMD 1000 includes the multifocal structure 1004 where the LC lens element 1006 is positioned to transmit light to the folded optics assembly 1008. For example, the LC lens element 1006 is placed in front of (e.g., from the perspective of the eye 265) the folded optics assembly 1008. The multifocal structure 1004 also includes a QWP 1020 positioned between the folded optics assembly 1008 and the LC lens element 1006. The QWP 1020 converts linearly polarized light output from the folded optics assembly 1008 into circularly polarized light for the LC lens element 1006 to selectively perform optical power addition or subtraction. The QWP 1020 may include a polarization axis Q3 which is ±45 degrees relative to the polarization axis P3 of the polarizer 1018. The pixel level polarizer 1002 outputs light in different polarizations P1 or P2, which results in propagation through the folded optics assembly 1008 along a direct path or folded path.

Table 4 shown below illustrates four states of the multifocal structure 1004 including a PBP lens 450 that result in four different focal distances, and thus four different image planes.

TABLE 4

Four states of the multifocal structure 1004 including PBP lens 450 that result in four different focal distances.

| Image Plane | Pixel Level Polarizer | PBP Lens Optical Power | Folded Path |
|---|---|---|---|
| 1 | Linear 45° | f | Y |
| 2 | Linear 45° | 0 | Y |
| 3 | Linear 135° | f | N |
| 4 | Linear 135° | 0 | N |

Figure 11:
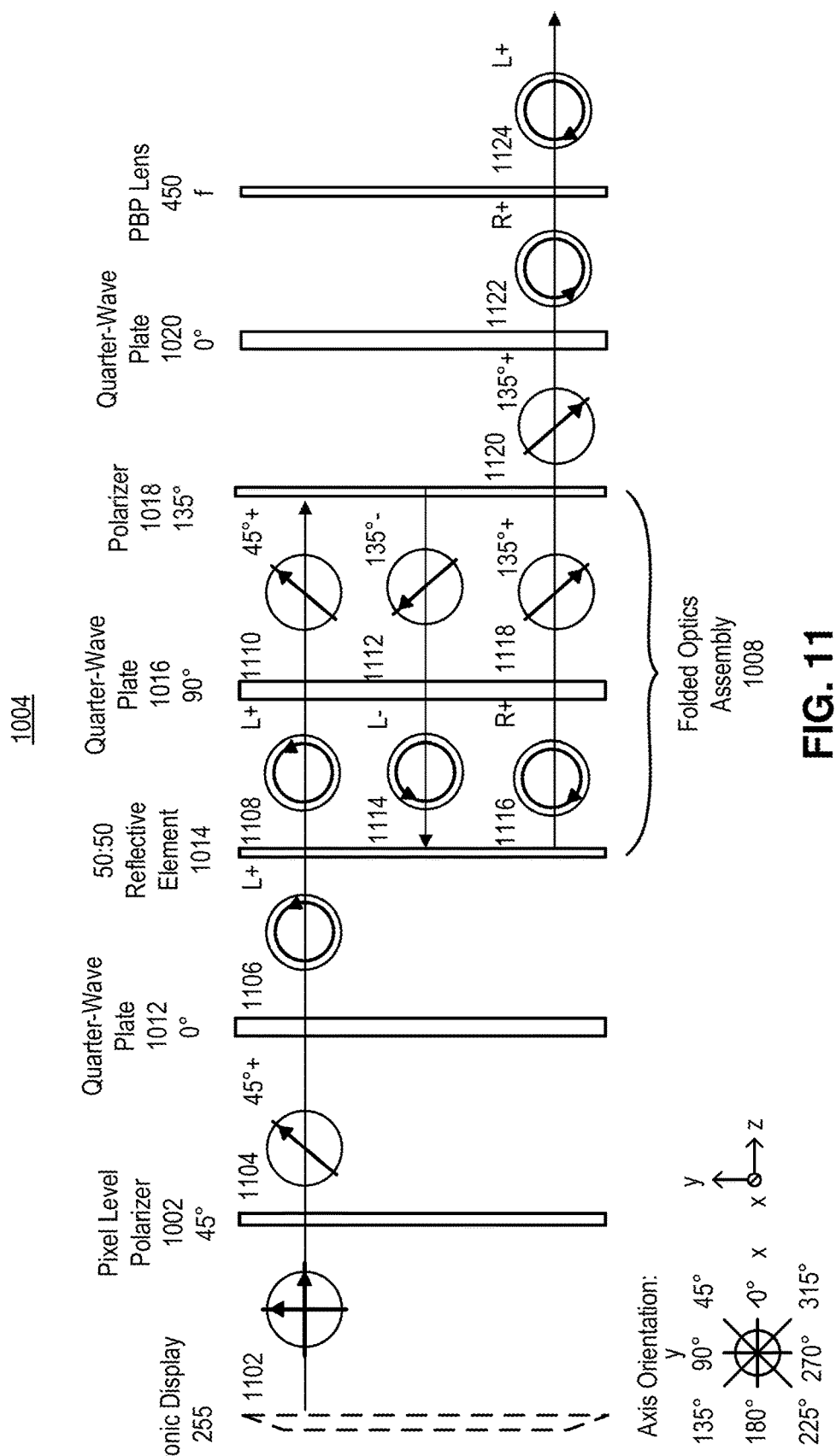
FIG. 11 illustrates an optical path in the multifocal structure shown in FIG. 10, according to one embodiment.

FIG. 11 illustrates an optical path in a multifocal structure (e.g., multifocal structure 1004), according to one embodiment. The optical path corresponds with image plane 1 shown in Table 4. The electronic display 255 generates an image light 1102, and provides the image light 1102 to the pixel level polarizer 1002. The pixel level polarizer 1002 transmits a portion of the image light 1102 as linearly polarized light 1104 oriented along 45 degrees. The linearly polarized light 1104 propagates to the QWP 1012. The QWP 1012 has an optic axis oriented 45 degrees with respect to the pixel level polarizer 1002, or 0 degrees. The QWP 1012 converts the linearly polarized light 1104 into LCP light 1106.

The folded optics assembly 1008 cause incident light to propagate along the direct path or folded path based on the polarization of the incident light. The LCP light 1106 has a left circular polarization, and thus takes the folded path as shown in FIG. 11. If the incident light has a right circular polarization (e.g., for linear light at 135 degrees transmitted through the pixel level polarizer 1002 and converted by the QWP 1012), the incident light takes the direct path (not shown).

The 50:50 reflective element 1014 reflects 50% of the incident LCP light 1106, and transmits 50% of the LCP light 1106 as LCP light 1108 propagating in the +z direction. The QWP 1016 converts the incident LCP light 1108 into linearly polarized light 1110 oriented along 45 degrees propagating in the +z direction. The polarizer 1018 reflects the linearly polarized light 1110 as linearly polarized light 1112 oriented along 135 degrees propagating in the −z direction. The QWP 1016 converts the incident linearly polarized light 1112 into LCP light 1114 propagating in the −z direction. The 50:50 reflective element 1014 transmits 50% of the incident LCP light 1114, and reflects 50% of the incident LCP light 1114 as RCP light 1116 propagating in the +z direction. The QWP 1016 converts the incident RCP light 1116 into linearly polarized light 1118 oriented along 135 degrees and propagating in the +z direction. The polarizer 1018 transmits the linearly polarized light 1118 as linearly polarized light 1120 oriented along 135 degrees and propagating out of the folded optics assembly 1008 in the +z direction.

The linearly polarized light 1120 propagates to the QWP 1020, where it is converted into a circular polarization for the PBP lens 450. The QWP 1020 has an optic axis oriented 45 degrees with respect to the polarizer 1018, such as at 0 degrees. The QWP 1020 converts the linearly polarized light 1120 oriented along 135 degrees into RCP light 1122.

The PBP lens 450 is set to the active state. The polarization of the incident RCP light 1122 and the PBP lens 450 being in the active state results in the PBP lens 450 having increased optical power ("f"), and changes the polarization of the incident RCP light 1122 into LCP light 1124 to produce the image plane 1. In some embodiments, an additional QWP may be placed in front of the PBP lens 450 in the multifocal structure 1004 to convert the LCP light 1124 into linearly polarized light. With reference to Table 5, the image plane 2 can be produced by setting the LC lens element in the neutral state (0), or in some embodiments, a subtractive state. The image planes 3 and 4 can be produced by light taking the direct path through the folded optic assembly 1008 and the PBP lens 450 providing different optical powers. The image plan 3 is produced with the PBP lens 450 providing additive optical power. The image plane 4 is produced with the PBP lens 450 providing no change in optical power.

With reference to the multifocal structure 1004 shown in FIG. 10, the polarizer 1018 may have a polarization axis P3 that is aligned along 45 degrees (e.g., rather than 135 degrees as shown in FIG. 11). Table 5 shown below illustrates four states of the multifocal block 1004 of the HMD 1000 having polarizer 1018 aligned along 45 degrees and a PBP lens 450 that result in four different focal distances, and thus four different image planes.

TABLE 5

Four states of the multifocal structure 1004 including PBP lens 450 that result in four different focal distances.

| Image Plane | Pixel Level Polarizer | PBP Lens Optical Power | Folded Path |
|---|---|---|---|
| 1 | Linear 45° | f | N |
| 2 | Linear 45° | 0 | N |
| 3 | Linear 135° | f | Y |
| 4 | Linear 135° | 0 | Y |

Figure 12:
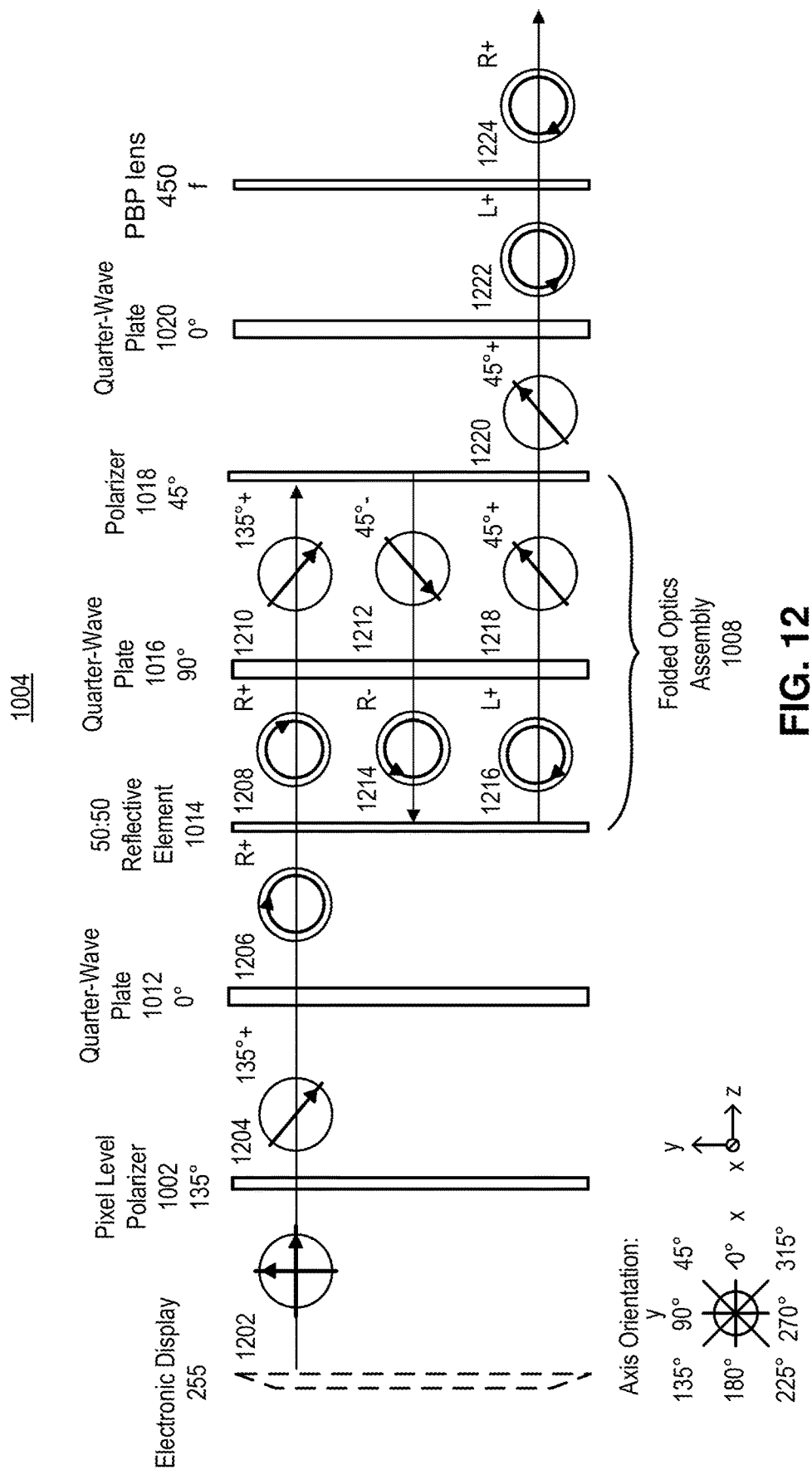
FIG. 12 illustrates an optical path in the multifocal structure shown in FIG. 10, according to one embodiment.

FIG. 12 illustrates an optical path in a multifocal structure (e.g., multifocal structure 1004) having a polarizer 1016 aligned along 45 degrees and a PBP lens 450, according to one embodiment. The optical path is a folded path that corresponds with image plane 3 shown in Table 5. The electronic display 255 generates an image light 1202, and provides the image light 1202 to the pixel level polarizer 1002. The pixel level polarizer 1002 transmits a portion of the image light 1202 as linearly polarized light 1204 oriented along 135 degrees. The linearly polarized light 1204 propagates to the QWP 1012. The QWP 1012 converts the linearly polarized light 1204 into RCP light 1206.

The RCP light 1206 has a right circular polarization, and thus takes the folded beam path as shown in FIG. 12. If the incident light has a left circular polarization (e.g., for linear light at 45 degrees transmitted through the pixel level polarizer 1002 and converted by the QWP 1012), the incident light takes the direct path (not shown).

The 50:50 reflective element 1014 reflects 50% of the incident RCP light 1206, and transmits 50% of the RCP light 1206 as RCP light 1208 propagating in the +z direction. The QWP 1016 converts the incident RCP light 1208 into linearly polarized light 1210 oriented along 135 degrees propagating in the +z direction. Because the polarizer 1018 has a polarization axis aligned along 45 degrees, the polarizer 1018 reflects the linearly polarized light 1210 as linearly polarized light 1212 oriented along 45 degrees propagating in the −z direction. The QWP 1016 converts the incident linearly polarized light 1212 into RCP light 1214 propagating in the −z direction. The 50:50 reflective element 1014 transmits 50% of the incident RCP light 1214, and reflects 50% of the incident RCP light 1214 as LCP light 1216 propagating in the +z direction. The QWP 1016 converts the incident LCP light 1216 into linearly polarized light 1218 oriented along 45 degrees and propagating in the +z direction. The polarizer 1018 transmits the linearly polarized light 1218 as linearly polarized light 1220 oriented along 45 degrees and propagating out of the folded optics assembly 1008 in the +z direction.

The linearly polarized light 1220 propagates to the QWP 1020, where it is converted into a circular polarization for the PBP lens 450. The QWP 1020 converts the linearly polarized light 1220 oriented along 135 degrees into LCP light 1222.

The PBP lens 450 is set to the active state. The polarization of the incident LCP light 1222 and the PBP lens 450 being in the additive state results in the PBP lens 450 having increased optical power ("f"), and changes the polarization of the incident LCP light 1222 into RCP light 924 to produce the image plane 3. In some embodiments, an additional QWP may be placed in front (from the perspective of the user) of the PBP lens 450 in the multifocal structure 1004 to convert the RCP light 1224 into linearly polarized light.

With reference to Table 5, the image planes 1 and 2 can be produced setting the PBP lens 450 in the active state ("f") or in the neutral states ("0") respectively for linearly polarized light aligned along 45 degrees output from the pixel level polarizer 1002. Here, the light takes the direct path through the folded optics 1008. The image plane 4 can be produced by setting the PBP lens 450 in the neutral state (0) for linearly polarized light aligned along 135 degrees output from the pixel level polarizer 1002.

In some embodiments, the LC lens element 1006 of the multifocal structure 1004 includes the LC lens 400 and a polarizer 1018 having polarization axis aligned along 45 degrees. Table 6 illustrates four states of the multifocal structure 1004 in such a configuration.

TABLE 6

Four states of the multifocal structure 1004 including LC lens 400 that result in four different focal distances.

| Image Plane | Pixel Level Polarizer | LC Lens Optical Power | Folded Path |
|---|---|---|---|
| 1 | Linear 45° | f | N |
| 2 | Linear 45° | 0 | N |
| 3 | Linear 135° | f | Y |
| 4 | Linear 135° | 0 | Y |

Figure 13:
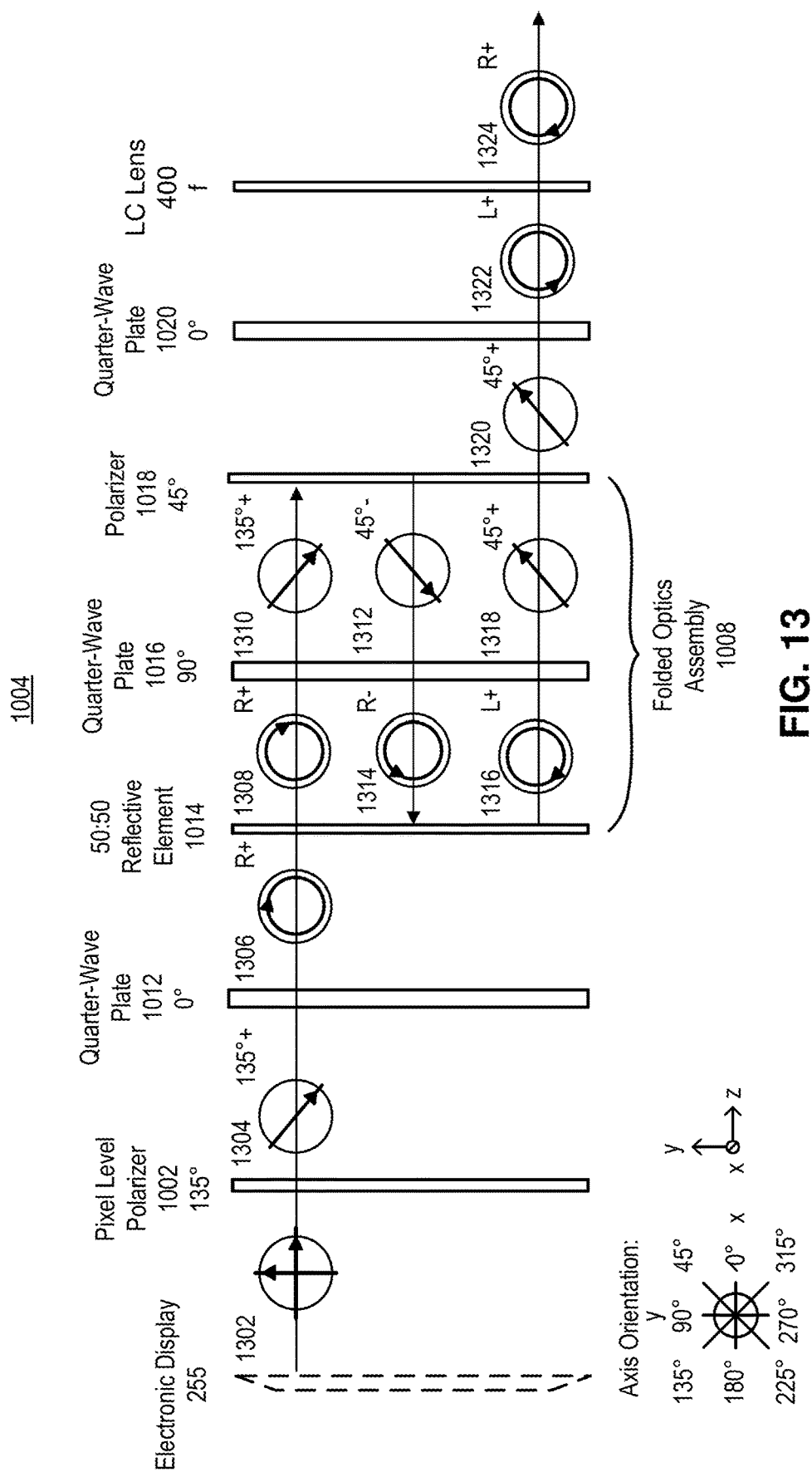
FIG. 13 illustrates an optical path in the multifocal structure shown in FIG. 10, according to one embodiment.

FIG. 13 illustrates an optical path in the multifocal block 1004 using a polarizer 1018 aligned along 45 degrees and a LC lens 400, according to one embodiment. The optical path is a folded path that corresponds with image plane 3 shown in Table 6. The multifocal block 1004 causes image light 1302 emitted from the electronic display to take the folded path through the folded optics assembly 1008, which outputs linearly polarized light 1320 aligned along 45 degrees. The QWP 1020 converts the linearly polarized light 1320 into LCP light 1322. The discussion above regarding propagation of light 1202 through 1222 in FIG. 12 is applicable to light 1302 through 1322.

The LC lens 400 is in the additive state (f), and thus adds optical power without changing the polarization of incident light. As such, the LC lens 400 outputs LCP light 1324 to produce the image plane 3.

With reference to Table 6, the image planes 1 and 2 can be produced setting the LC lens 400 in the additive (f) or in the neutral states (0) respectively for linearly polarized light aligned along 45 degrees output from the pixel level polarizer 1002. The light takes the direct path through the folded optics assembly 1008. The image plane 4 can be produced by setting the LC lens 400 in the neutral state (0) for linearly polarized light aligned along 135 degrees output from the pixel level polarizer 1002. Here, the light takes the folded path through the folded optics assembly 1008.

System Overview

Figure 14:
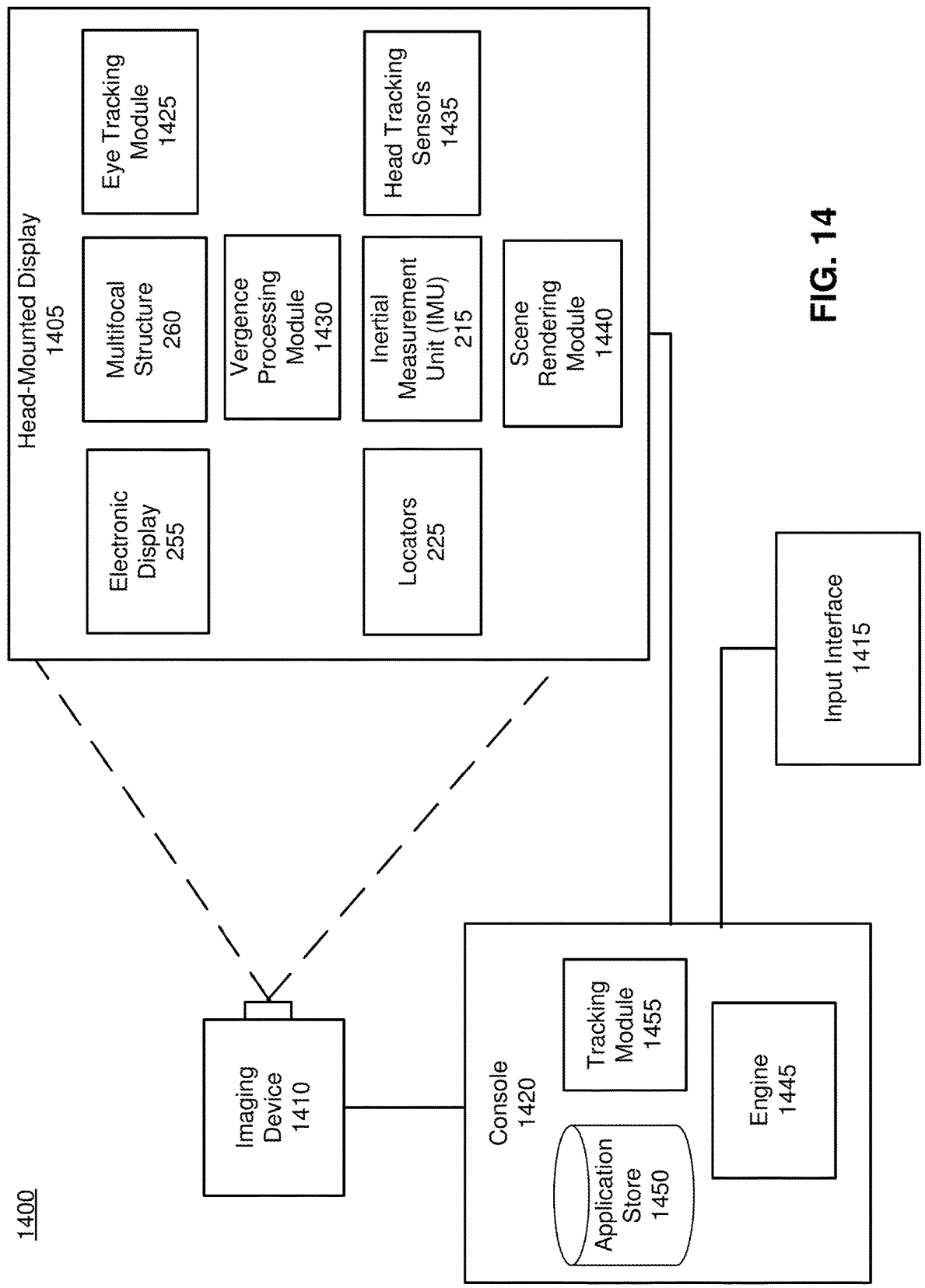
FIG. 14 illustrates a multifocal system in which a HMD operates, according to an embodiment.

FIG. 14 is multifocal system 1400 in which a HMD 1405 operates. The multifocal system 1400 may be for use as a virtual reality (VR) system, an augmented reality (AR) system, a mixed reality (MR) system, or some combination thereof. In this example, the multifocal system 1400 includes a HMD 1405, an imaging device 1410, and an input interface 1415, which are each coupled to a console 1420. While FIG. 14 shows a single HMD 1405, a single imaging device 1410, and a single input interface 1415, in other embodiments, any number of these components may be included in the system. For example, there may be multiple HMDs 1405 each having an associated input interface 1415 and being monitored by one or more imaging devices 1410, with each HMD 1405, input interface 1415, and imaging devices 1410 communicating with the console 1420. In alternative configurations, different and/or additional components may also be included in the multifocal system 1400. The HMD 1405 may act as a VR, AR, and/or a MR HMD. An MR and/or AR HMD augments views of a physical, real-world environment with computer-generated elements (e.g., images, video, sound, etc.).

The HMD 1405 presents content to a user. In some embodiments, the HMD 1405 is an embodiment of the HMD 200, 600, or 1000 described above with reference to FIGS. 2A, 2B, 6, and 10. Example content includes images, video, audio, or some combination thereof. Audio content may be presented via a separate device (e.g., speakers and/or headphones) external to the HMD 1405 that receives audio information from the HMD 1405, the console 1420, or both. The HMD 1405 includes an electronic display 255 (described above with reference to FIG. 2B), a multifocal structure 260 (described above with reference to FIG. 2B), an eye tracking module 1425, a vergence processing module 1430, one or more locators 225, an internal measurement unit (IMU) 215, head tracking sensors 1435, and a scene rendering module 1440.

The multifocal structure 260 controls a pixel level polarizer and a LC lens element to adjust a focal length (adjusts optical power) of the multifocal structure 260. The multifocal structure 260 adjusts its focal length responsive to focus instructions from an eye tracking system. The eye tracking system may be separate from the HMD 1405, such as at the console 1420, or may be incorporated within the HMD 1405 (e.g., with the vergence processing module 1430).

The eye tracking module 1425 tracks an eye position and eye movement of a user of the HMD 1405. A camera or other optical sensor inside the HMD 1405 captures image information of a user's eyes, and eye tracking module 1425 uses the captured information to determine interpupillary distance, interocular distance, a three-dimensional (3D) position of each eye relative to the HMD 1405 (e.g., for distortion adjustment purposes), including a magnitude of torsion and rotation (i.e., roll, pitch, and yaw) and gaze directions for each eye. In one example, infrared light is emitted within the HMD 1054 and reflected from each eye. The reflected light is received or detected by the camera and analyzed to extract eye rotation from changes in the infrared light reflected by each eye. Many methods for tracking the eyes of a user can be used by eye tracking module 1425. Accordingly, the eye tracking module 1425 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 1425 integrates information from past measurements, measurements identifying a position of a user's head, and 3D information describing a scene presented by the electronic display 255. Thus, information for the position and orientation of the user's eyes is used to determine the gaze point in a virtual scene presented by the HMD 1405 where the user is looking.

The vergence processing module 1430 determines a vergence depth of a user's gaze based on the gaze point or an estimated intersection of the gaze lines determined by the eye tracking module 1425. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 1430 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 225 are objects located in specific positions on the HMD 805 relative to one another and relative to a specific reference point on the HMD 1405. A locator 125 may be a light emitting diode (LED), a corner cube reflector, a reflective marker, a type of light source that contrasts with an environment in which the HMD 1405 operates, or some combination thereof. Active locators 225 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 225 can be located beneath an outer surface of the HMD 1405, which is transparent to the wavelengths of light emitted or reflected by the locators 225 or is thin enough not to substantially attenuate the wavelengths of light emitted or reflected by the locators 225. Further, the outer surface or other portions of the HMD 1405 can be opaque in the visible band of wavelengths of light. Thus, the locators 225 may emit light in the IR band while under an outer surface of the HMD 1405 that is transparent in the IR band but opaque in the visible band.

The IMU 215 is an electronic device that generates fast calibration data based on measurement signals received from one or more of the head tracking sensors 1435, which generate one or more measurement signals in response to motion of HMD 1405. Examples of the head tracking sensors 1435 include accelerometers, gyroscopes, magnetometers, other sensors suitable for detecting motion, correcting error associated with the IMU 215, or some combination thereof. The head tracking sensors 1435 may be located external to the IMU 215, internal to the IMU 215, or some combination thereof.

Based on the measurement signals from the head tracking sensors 1435, the IMU 215 generates fast calibration data indicating an estimated position of the HMD 1405 relative to an initial position of the HMD 1405. For example, the head tracking sensors 1435 include multiple accelerometers to measure translational motion (forward/back, up/down, left/right) and multiple gyroscopes to measure rotational motion (e.g., pitch, yaw, and roll). The IMU 215 can, for example, rapidly sample the measurement signals and calculate the estimated position of the HMD 1405 from the sampled data. For example, the IMU 215 integrates measurement signals received from the accelerometers over time to estimate a velocity vector and integrates the velocity vector over time to determine an estimated position of a reference point on the HMD 1405. The reference point is a point that may be used to describe the position of the HMD 1405. While the reference point may generally be defined as a point in space, in various embodiments, a reference point is defined as a point within the HMD 1405 (e.g., a center of the IMU 215). Alternatively, the IMU 215 provides the sampled measurement signals to the console 1420, which determines the fast calibration data.

The IMU 215 can additionally receive one or more calibration parameters from the console 1420. As further discussed below, the one or more calibration parameters are used to maintain tracking of the HMD 1405. Based on a received calibration parameter, the IMU 215 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 1440 receives content for the virtual scene from a (e.g., VR) engine 1445 and provides the content for display on the electronic display 255. Additionally, the scene rendering module 1440 can adjust the content based on information from the vergence processing module 1430, the IMU 215, and the head tracking sensors 1435. The scene rendering module 1440 determines a portion of the content to be displayed on the electronic display 255 based on one or more of the tracking module 1455, the head tracking sensors 1435, or the IMU 215, as described further below.

The imaging device 1410 generates slow calibration data in accordance with calibration parameters received from the console 1420. Slow calibration data includes one or more images showing observed positions of the locators 225 that are detectable by imaging device 1410. The imaging device 1410 may include one or more cameras, one or more video cameras, other devices capable of capturing images including one or more locators 225, or some combination thereof. Additionally, the imaging device 1410 may include one or more filters (e.g., for increasing signal to noise ratio). The imaging device 1410 is configured to detect light emitted or reflected from the locators 225 in a field of view of the imaging device 1410. In embodiments where the locators 225 include passive elements (e.g., a retroreflector), the imaging device 1410 may include a light source that illuminates some or all of the locators 225, which retro-reflect the light towards the light source in the imaging device 1410. Slow calibration data is communicated from the imaging device 1410 to the console 1420, and the imaging device 1410 receives one or more calibration parameters from the console 1420 to adjust one or more imaging parameters (e.g., focal length, focus, frame rate, ISO, sensor temperature, shutter speed, aperture, etc.).

The input interface 1415 is a device that allows a user to send action requests to the console 1420. An action request is a request to perform a particular action. For example, an action request may be to start or end an application or to perform a particular action within the application. The input interface 1415 may include one or more input devices. Example input devices include a keyboard, a mouse, a game controller, or any other suitable device for receiving action requests and communicating the received action requests to the console 820. An action request received by the input interface 1415 is communicated to the console 1420, which performs an action corresponding to the action request. In some embodiments, the input interface 1415 may provide haptic feedback to the user in accordance with instructions received from the console 1420. For example, haptic feedback is provided by the input interface 1415 when an action request is received, or the console 1420 communicates instructions to the input interface 1415 causing the input interface 815 to generate haptic feedback when the console 1420 performs an action.

The console 1420 provides content to the HMD 1405 for presentation to the user in accordance with information received from the imaging device 1410, the HMD 1405, or the input interface 1415. In the example shown in FIG. 14, the console 1420 includes an application store 1450, a tracking module 1455, and the engine 1445. Some embodiments of the console 1420 have different or additional modules than those described in conjunction with FIG. 14. Similarly, the functions further described below may be distributed among components of the console 1420 in a different manner than is described here.

The application store 1450 stores one or more applications for execution by the console 1420. An application is a group of instructions, that when executed by a processor, generates content for presentation to the user. Content generated by an application may be in response to inputs received from the user via movement of the HMD 1405 or the input interface 1415. Examples of applications include gaming applications, conferencing applications, video playback application, or other suitable applications.

The tracking module 1455 calibrates the multifocal system 1400 using one or more calibration parameters and may adjust one or more calibration parameters to reduce error in determining position of the HMD 1405. For example, the tracking module 1455 adjusts the focus of the imaging device 1410 to obtain a more accurate position for observed locators 225 on the HMD 1405. Moreover, calibration performed by the tracking module 1455 also accounts for information received from the IMU 215. Additionally, if tracking of the HMD 1405 is lost (e.g., imaging device 1410 loses line of sight of at least a threshold number of locators 225), the tracking module 1455 re-calibrates some or all of the multifocal system 1400 components.

Additionally, the tracking module 1455 tracks the movement of the HMD 1405 using slow calibration information from the imaging device 1410 and determines positions of a reference point on the HMD 1405 using observed locators from the slow calibration information and a model of the HMD 1405. The tracking module 1455 also determines positions of the reference point on the HMD 1405 using position information from the fast calibration information from the IMU 215 on the HMD 1405. Additionally, the tracking module 1455 may use portions of the fast calibration information, the slow calibration information, or some combination thereof, to predict a future location of the HMD 1405, which is provided to the engine 1445.

The engine 1445 executes applications within the multifocal system 1400 and receives position information, acceleration information, velocity information, predicted future positions, or some combination thereof for the HMD 1405 from the tracking module 1455. Based on the received information, the engine 1445 determines content to provide to the HMD 1405 for presentation to the user, such as a virtual scene, one or more virtual objects to overlay onto a real world scene, etc.

In some embodiments, the engine 1445 maintains focal capability information of the multifocal structure 260. Focal capability information is information that describes what focal distances are available to the multifocal structure 260. Focal capability information may include, e.g., a range of focus the multifocal structure 260 is able to accommodate (e.g., 0 to 4 diopters), a resolution of focus (e.g., 0.25 diopters), a number of focal planes, combinations of settings for optical components of the multifocal structure 260 that map to particular focal planes, combinations of settings for pixel level polarizer and LC lens elements that map to particular focal planes, or some combination thereof.

The engine 1445 generates focus instructions for the multifocal structure 260, the instructions causing the multifocal structure 260 to adjust its focal distance to a particular location. The engine 1445 generates the focus instructions based on focal capability information and, e.g., information from the vergence processing module 1430, the IMU 215, and the head tracking sensors 1435. The engine 1445 uses the information from the vergence processing module 1430, the IMU 215, and the head tracking sensors 1435, or some combination thereof, to select an ideal focal plane to present content to the user. The engine 1445 then uses the focal capability information to select a focal plane that is closest to the ideal focal plane. The engine 845 uses the focal information to determine settings for the pixel level polarizer, the LC lens element, or some combination thereof, within the multifocal structure 260 that are associated with the selected focal plane. The engine 1445 generates instructions based on the determined settings, and provides the instructions to the multifocal structure 260.

Additionally, the engine 1445 performs an action within an application executing on the console 1420 in response to an action request received from the input interface 1415 and provides feedback to the user that the action was performed. The provided feedback may be visual or audible feedback via the HMD 1405 or haptic feedback via input interface 1415.

Figure 15:
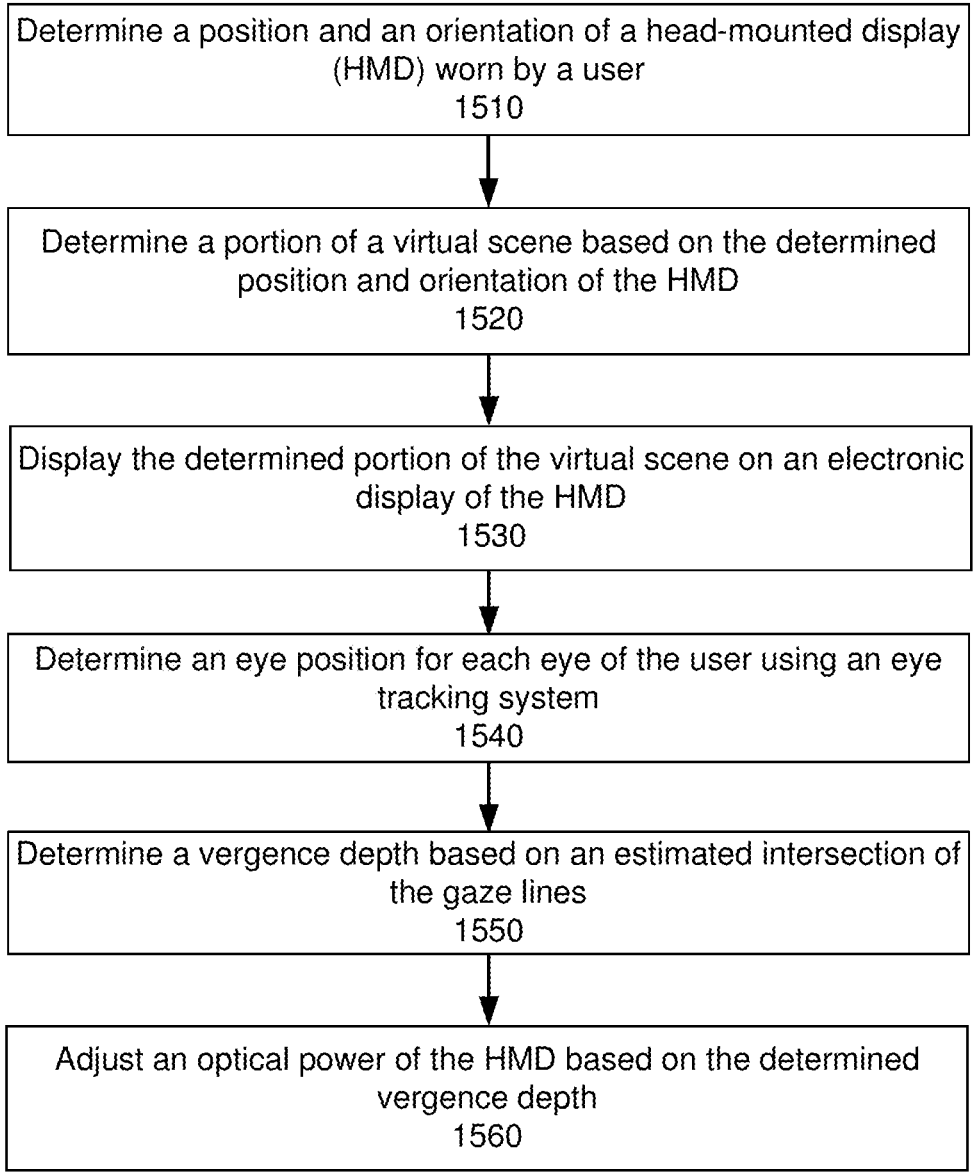
FIG. 15 illustrates a process for mitigating vergence-accommodation conflict by adjusting the focal length of a HMD, according to an embodiment.

FIG. 15 is a process 1500 for mitigating vergence-accommodation conflict by adjusting the focal length of an HMD 1405, according to an embodiment. The process 1500 may be performed by the multifocal system 1400 in some embodiments. Alternatively, other components may perform some or all of the steps of the process 1500. For example, in some embodiments, a HMD 1405 and/or a console (e.g., console 1420) may perform some of the steps of the process 1500. Additionally, the process 1500 may include different or additional steps than those described in conjunction with FIG. 15 in some embodiments or perform steps in different orders than the order described in conjunction with FIG. 15.

As discussed above, a multifocal system 1400 may dynamically vary its focus to bring images presented to a user wearing the HMD 1405 into focus, which keeps the user's eyes in a zone of comfort as vergence and accommodation change. Additionally, eye tracking in combination with the variable focus of the multifocal system 1400 allows blurring to be introduced as depth cues in images presented by the HMD 1405.

The multifocal system 1400 determines 1510 a position, an orientation, and/or a movement of HMD 1405. The position is determined by a combination of the locators 225, the IMU 215, the head tracking sensors 1435, the imagining device 1410, and the tracking module 1455, as described above in conjunction with FIG. 14.

The multifocal system 1400 determines 1520 a portion of a virtual scene based on the determined position and orientation of the HMD 1405. The multifocal system 1400 maps a virtual scene presented by the HMD 1405 to various positions and orientations of the HMD 1405. Thus, a portion of the virtual scene currently viewed by the user is determined based on the position, orientation, and movement of the HMD 1405.

The multifocal system 1400 displays 1530 the determined portion of the virtual scene being on an electronic display (e.g., the electronic display 255) of the HMD 1405. In some embodiments, the portion is displayed with a distortion correction to correct for optical error that may be caused by the image light passing through the multifocal structure 260. Further, the multifocal structure 260 has a state of the pixel level polarizer and a configuration of the LC lens element, or some combination thereof, to provide focus and accommodation to the location in the portion of the virtual scene where the user's eyes are verged.

The multifocal system 1400 determines 1540 an eye position for each eye of the user using an eye tracking system. The multifocal system 1400 determines a location or an object within the determined portion at which the user is looking to adjust focus for that location or object accordingly. To determine the location or object within the determined portion of the virtual scene at which the user is looking, the HMD 1405 tracks the position and location of the user's eyes using image information from an eye tracking system (e.g., eye tracking module 1425). For example, the HMD 1405 tracks at least a subset of a 3D position, roll, pitch, and yaw of each eye and uses these quantities to estimate a 3D gaze point of each eye.

Figure 16:
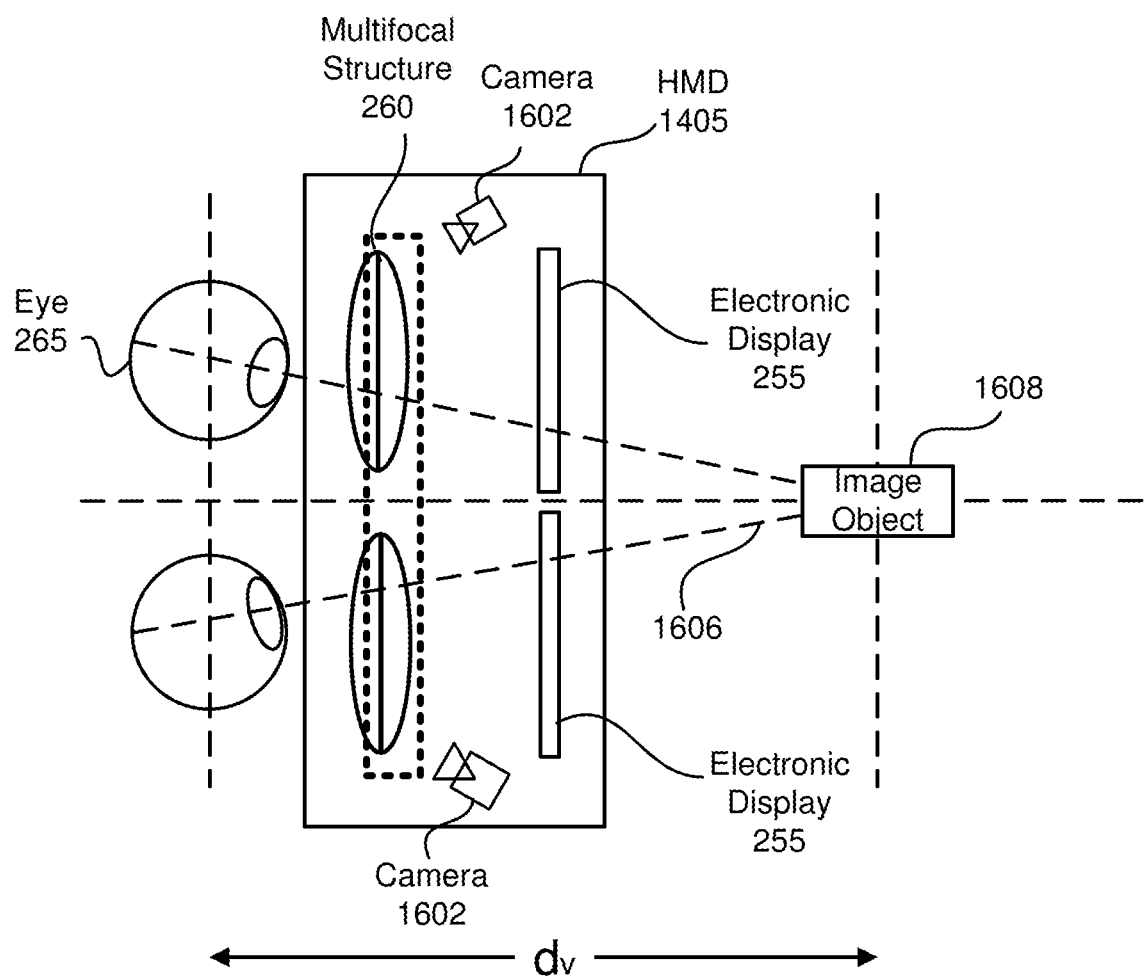
FIG. 16 illustrates an example process for mitigating vergence-accommodation conflict by adjusting a focal length of a multifocal structure, according to an embodiment.

The multifocal system 1400 determines 1550 a vergence depth based on an estimated intersection of gaze lines. For example, FIG. 16 shows a cross section of an embodiment of the HMD 1405 that includes camera 1602 for tracking a position of each eye 265, the electronic display 255, and the multifocal structure 260. In this example, the camera 1602 captures images of the user's eyes looking at an image object 1608 and the eye tracking module 1425 determines an output for each eye 265 and gaze lines 1606 corresponding to the gaze point or location where the user is looking based on the captured images. Accordingly, vergence depth ($d_v$) of the image object 1608 (also the user's gaze point) is determined 1550 based on an estimated intersection of the gaze lines 1606. As shown in FIG. 16, the gaze lines 1606 converge or intersect at distance where the image object 1608 is located. In some embodiments, information from past eye positions, information describing a position of the user's head, and information describing a scene presented to the user may also be used to estimate the 3D gaze point of an eye in various embodiments.

Accordingly, referring again to FIG. 15, the multifocal system 1400 adjusts 1560 an optical power of the HMD 1405 based on the determined vergence depth. The multifocal system 1400 selects a focal plane closest to the determined vergence depth by controlling the pixel level polarizer, the LC lens element, or some combination thereof. As described above, the optical power of the multifocal structure 260 is adjusted to change a focal distance of the HMD 1405 to provide accommodation for the determined vergence depth corresponding to where or what in the displayed portion of the virtual scene the user is looking.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display, comprising:
a multifocal structure having a plurality of possible focal distances, the multifocal structure comprising:
a plurality of optical components positioned in series such that light from an electronic display is received and passes through each of the plurality of optical components at least once before being output from the multifocal structure, the plurality of optical components including:
a pixel level polarizer positioned to receive light from the electronic display, the pixel level polarizer having a first configuration that causes the pixel level polarizer to linearly polarize light in a first direction and a second configuration that causes the pixel level polarizer to linearly polarize light in a second direction that is different than the first direction, and wherein the multifocal structure is configured to output image light at different focal distances based in part on the configuration of the pixel level polarizer; and
a liquid crystal (LC) element that has first state that adjusts optical power of the multifocal structure to a first diopter and a second state that adjusts optical power of the multifocal structure to a second diopter.

2. The head-mounted display of claim 1, wherein the first state of the LC element is an additive state that adds optical power and the second state of the LC element is a neutral state that does not change optical power.

3. The head-mounted display of claim 1, wherein the first state of the LC element is an additive state that adds optical power and the second state is a subtractive state that subtracts optical power.

4. The head-mounted display of claim 1, wherein the first state of the LC element is a subtractive state that subtracts optical power and the second state is a neutral state that does not change optical power.

5. The head-mounted display of claim 1, wherein the LC element has a third state that adjusts optical power of the multifocal structure to a third diopter.

6. The head-mounted display of claim 1, wherein the plurality of optical components includes a folded optics assembly that is configured to direct light along different optical paths based in part on a polarization of light incident on the folded optics assembly, and wherein the different optical paths each have different optical path lengths.

7. The head-mounted display of claim 6, wherein plurality of optical elements includes a first quarter wave plate (QWP) positioned to receive light from the pixel level polarizer; and
the folded optics assembly includes:
a 50:50 reflective element positioned to receive light from the first QWP;
a second QWP positioned to receive light from the 50:50 reflective element; and
a polarizer positioned to receive light from the second QWP.

8. The head-mounted display of claim 7, wherein:
the LC element is positioned between the first QWP and the 50:50 reflective element.

9. The head-mounted display of claim 7, wherein:
the LC element is positioned between the 50:50 reflective element and the second QWP.

10. The head-mounted display of claim 7, wherein:
a third QWP is positioned to receive light from the polarizer; and
the LC element is positioned to receive light from the third QWP.

11. The head-mounted display of claim 1, wherein the pixel level polarizer includes a plurality of cells including at least a first set and a second set, and the pixel the pixel level polarizer has a third configuration that causes the pixel level polarizer to linearly polarize light passing through the first set of cells in the first direction and to linearly polarize light passing through the second set of cells in the second direction.

12. The head-mounted display of claim 1, further comprising:
an eye tracking system configured to determine eye tracking information for an eye of the user;
and wherein the eye tracking system is further configured to:
determine a focal distance, of the plurality of possible focal distances, using the eye tracking information, wherein the focal distance is the first focal distance,
generate focus instructions using the determined first focal distance, and
provide the focus instructions to the multifocal structure, wherein responsive to receipt of the focus instructions the multifocal structure configures the pixel level polarizer and the LC element to output light at the first focal distance.

13. An optical system for an electronic display, comprising:
a multifocal structure having a plurality of possible focal distances, the multifocal structure comprising:
a plurality of optical components positioned in series such that light from an electronic display is received and passes through each of the plurality of optical components at least once before being output from the multifocal structure, the plurality of optical components including:
a pixel level polarizer positioned to receive light from the electronic display, the pixel level polarizer having a first configuration that causes the pixel level polarizer to linearly polarize light in a first direction and a second configuration that causes the pixel level polarizer to linearly polarize light in a second direction that is different than the first direction; and
a liquid crystal (LC) element that has first state that adjusts optical power of the multifocal structure to a first diopter and a second state that adjusts optical power of the multifocal structure to a second diopter.

14. The optical system of claim 13, wherein the first state of the LC element is an additive state that adds optical power and the second state of the LC element is a neutral state that does not change optical power.

15. The optical system of claim 13, wherein the first state of the LC element is an additive state that adds to optical power and the second state is a subtractive state that subtracts optical power.

16. The optical system of claim 13, wherein the first state of the LC element is a subtractive state that subtracts optical power and the second state is a neutral state that does not change optical power.

17. The optical system of claim 13, wherein the LC element has a third state that adjusts optical power of the multifocal structure to a third diopter.

18. The optical system of claim 13, wherein the plurality of optical components includes a folded optics assembly that is configured to direct light along different optical paths based in part on a polarization of light incident on the folded optics assembly, and wherein the different optical paths each have different optical path lengths.

19. The optical system of claim 13, wherein the plurality of optical components includes a folded optics assembly that is configured to direct light along different optical paths based in part on a polarization of light incident on the folded optics assembly, and wherein the different optical paths each have different optical path lengths.

20. The optical system of claim 19, wherein plurality of optical elements includes a first quarter wave plate (QWP) positioned to receive light from the pixel level polarizer; and
the folded optics assembly includes:
a 50:50 reflective element positioned to receive light from the first QWP;
a second QWP positioned to receive light from the 50:50 reflective element; and
a polarizer positioned to receive light from the second QWP.

* * * * *